(12) United States Patent
Arai

(10) Patent No.: US 12,513,275 B2
(45) Date of Patent: Dec. 30, 2025

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Kimitaka Arai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/788,690

(22) Filed: Jul. 30, 2024

(65) Prior Publication Data
US 2025/0047820 A1 Feb. 6, 2025

(30) Foreign Application Priority Data

Aug. 1, 2023 (JP) ................... 2023-125553

(51) Int. Cl.
*H04N 13/15* (2018.01)
*H04N 1/60* (2006.01)
*H04N 13/324* (2018.01)
*H04N 13/332* (2018.01)

(52) U.S. Cl.
CPC ............. *H04N 13/15* (2018.05); *H04N 1/60* (2013.01); *H04N 13/324* (2018.05)

(58) Field of Classification Search
CPC ........ H04N 13/15; H04N 1/06; H04N 13/332; H04N 13/324
USPC ............................................. 348/51
See application file for complete search history.

(56) References Cited

U.S. PATENT DOCUMENTS

2008/0158672 A1\* 7/2008 McCosky .............. G02B 30/23
359/464
2013/0154903 A1\* 6/2013 Kim ...................... H04N 13/15
345/1.1

FOREIGN PATENT DOCUMENTS

JP 2021110825 A 8/2021

\* cited by examiner

*Primary Examiner* — Jeffery A Williams
(74) *Attorney, Agent, or Firm* — Canon U.S.A., Inc. IP Division

(57) ABSTRACT

An image processing apparatus for generating a right eye image and a left eye image, includes one or more memories storing a program, and one or more processors that, upon execution of the stored program; are configured to operate as an acquisition unit configured to acquire a color vision characteristic representing a color appearance difference between right and left eyes of a user; and a conversion unit configured to perform color conversion on at least any one of the right eye image and the left eye image based on the color vision characteristic.

19 Claims, 26 Drawing Sheets

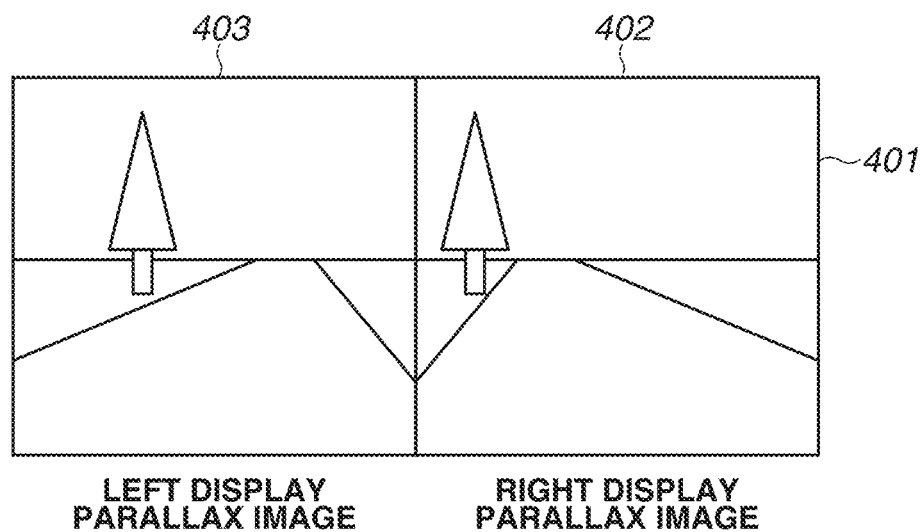
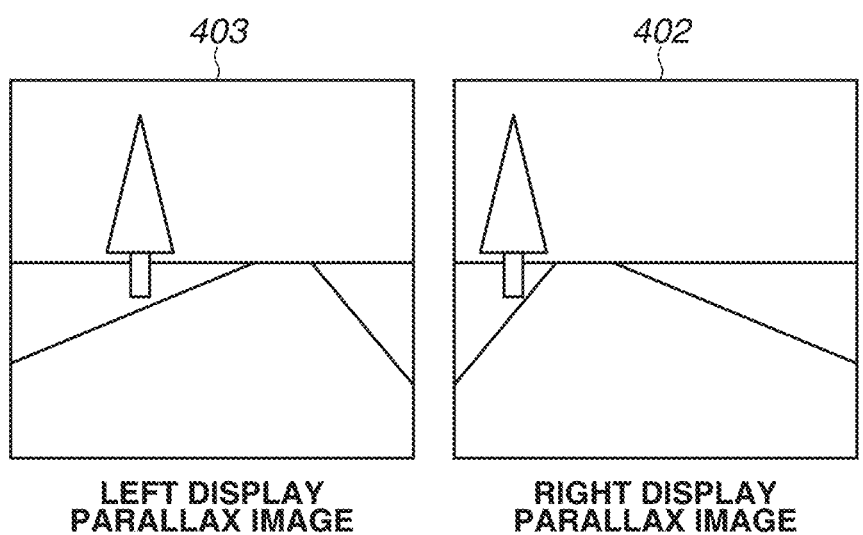

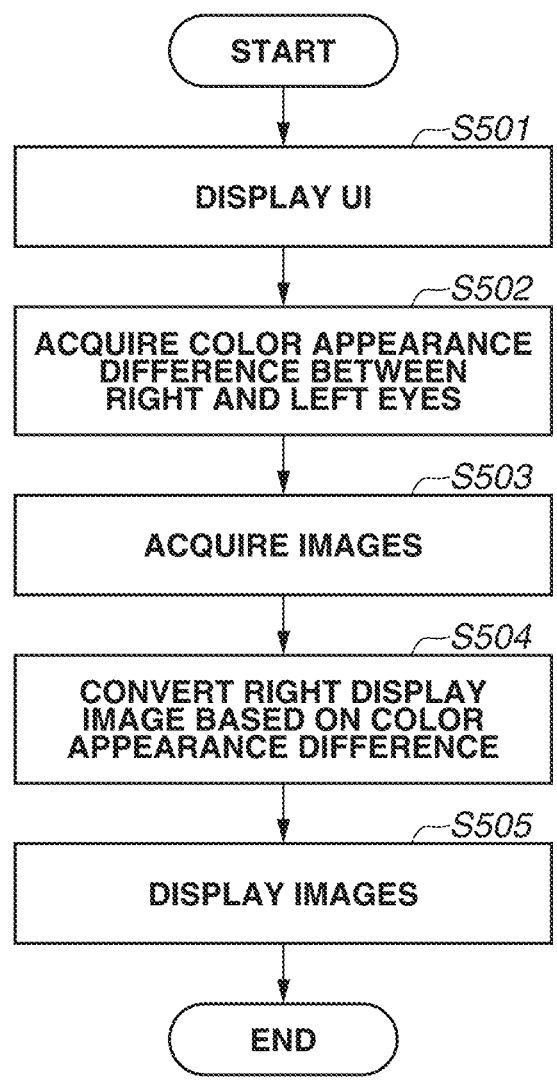

FIG.9

| No. | L* | a* | b* | EVALUATION |
|---|---|---|---|---|
| 1 | L1 | a1 | b1 | UNACCEPTABLE |
| 2 | L2 | a2 | b2 | UNACCEPTABLE |
| ⋮ | ⋮ | ⋮ | ⋮ | ⋮ |
| M | LM | aM | bM | OK |

| No. | L* | a* | b* | R | G | B |
|---|---|---|---|---|---|---|
| 1 | X1 | X2 | X3 | col1 | col1 | col1 |
| 2 | Y1 | Y2 | Y3 | col1 | col1 | col2 |
| ... | ... | ... | ... | ... | ... | ... |
| N×N×N | Z1 | Z2 | Z3 | colN | colN | colN |

| No. | L* | a* | b* | DATA FILE |
|---|---|---|---|---|
| 1 | L1 | a1 | b1 | ColorProfile1 |
| 2 | L2 | a2 | b2 | ColorProfile2 |
| ... | ... | ... | ... | ... |
| M | LM | aM | bM | ColorProfileM |

| No. | Rsrc | Gsrc | Bsrc | Rdst | Gdst | Bdst |
|---|---|---|---|---|---|---|
| 1 | col1 | col1 | col1 | XX1 | XX2 | XX3 |
| 2 | col1 | col1 | col2 | YY1 | YY2 | YY3 |
| ... | | ... | | | ... | |
| N × N × N | coiN | coiN | coiN | ZZ1 | ZZ2 | ZZ3 |

1501  1502  1503

LEFT DISPLAY    RIGHT DISPLAY

FULL-SCREEN UI

RIGHT/LEFT DISPLAYS

RIGHT/LEFT DISPLAYS

FIG.22

| No. | L* | a* | b* | COLOR MATCHING FUNCTION FILE |
|---|---|---|---|---|
| 1 | L1 | a1 | b1 | ColorMatchingFunction1 |
| 2 | L2 | a2 | b2 | ColorMatchingFunction2 |
| ⋮ | ⋮ | ⋮ | ⋮ | ⋮ |
| M | LM | aM | bM | ColorMatchingFunctionM |

FIG.25

| No. 2501 | L* | a* 2502 | b* | VIEWING ANGLE 2503 | COLOR MATCHING FUNCTION FILE CORRESPONDING TO VIEWING ANGLE 2504 |
|---|---|---|---|---|---|
| 1 | L1 | a1 | b1 | XX | ColorMatchingFunction1X |
| 2 | L2 | a2 | b2 | XX | ColorMatchingFunction2X |
| ... | | | | | ... |
| M | LM | aM | bM | ZZ | ColorMatchingFunctionMZ |

IMAGE PROCESSING APPARATUS, IMAGE PROCESSING METHOD, AND STORAGE MEDIUM

BACKGROUND

Technical Field

The present disclosure relates to color reproduction of a display.

Description of the Related Art

In recent years, there has been increased opportunities of viewing stereoscopic images with a head mounted display (HMD) mounted on a head in an entertainment field and an industrial field. With such HMDs, users view different images through the right and left eyes, so that binocular rivalry (a phenomenon where an appearance corresponding to the right eye and an appearance corresponding to the left eye alternately appear, where right and left eyes images are not integrated into one image) may occur to cause flickering if there is a difference in color appearance of the images viewed through the right and left eyes. As a technique for matching colors of displays, Japanese Patent Application Laid-Open No. 2021-110825 discusses a technique for expressing a color expressed by a reference value and a pixel value by a color coordinate system that does not depend on a display apparatus and converting the color into a pixel value of a display serving as an output destination. As a method using a color coordinate system that does not depend on a display apparatus, a method is available with which colors are converted into numerical values using the international commission on illumination (CIE) 1931 color matching function to numerically match the colors.

SUMMARY

According to an aspect of the present disclosure, an image processing apparatus for generating a right eye image and a left eye image, includes one or more memories storing a program, and one or more processors that, upon execution of the stored program; are configured to operate as an acquisition unit configured to acquire a color vision characteristic representing a color appearance difference between right and left eyes of a user; and a conversion unit configured to perform color conversion on at least any one of the right eye image and the left eye image based on the color vision characteristic.

Further features of the present disclosure will become apparent from the following description of exemplary embodiments with reference to the attached drawings.

BRIEF DESCRIPTION OF THE DRAWINGS

FIGS. 4A and 4B are diagrams illustrating examples of input images.

FIG. 5 is a flowchart illustrating processing to be performed by the image processing apparatus.

FIG. 9 is a table illustrating examples of color chart evaluation result data.

FIG. 11 is a diagram schematically illustrating a three-dimensional look-up table (3D_LUT).

FIG. 14 is a table illustrating an example of color conversion information.

FIG. 15 is a table illustrating examples of color conversion parameters.

FIG. 22 is a table illustrating an example of a group of color matching function files.

FIG. 25 is a table illustrating an example of a group of color matching function files.

DESCRIPTION OF THE EMBODIMENTS

In a case where a color matching function of a receptor is different, a difference occurs in color appearance even if a stimulus provided from a display is the same. Clouding in an eye lens and/or a difference between viewing angles in influence of macular abnormalities are/is regarded as a cause of difference in color matching function. The color matching function varies from one eyeball to another. Thus, even with color matching between displays as discussed in Japanese Patent Application Laid-Open No. 2021-110825, a difference occurs in color appearance of images viewed through the right and left eyes.

Thus, the present disclosure is directed to a technique for preventing or reducing the occurrence of a difference in color appearance between the right and left eyes.

Hereinafter, first to fifth exemplary embodiments are described with reference to the accompanying drawings.

A first exemplary embodiment of the present disclosure will be described below. In the first exemplary embodiment, in displaying an input image on right and left displays observed by the user's (observer's) right and left eyes, a user characteristic which represents a difference in color appearance between the user's right and left eyes is acquired, and processing for converting the input image is performed based on the acquired user characteristic.

<Hardware Configuration of Image Processing Apparatus>

Figure 1:
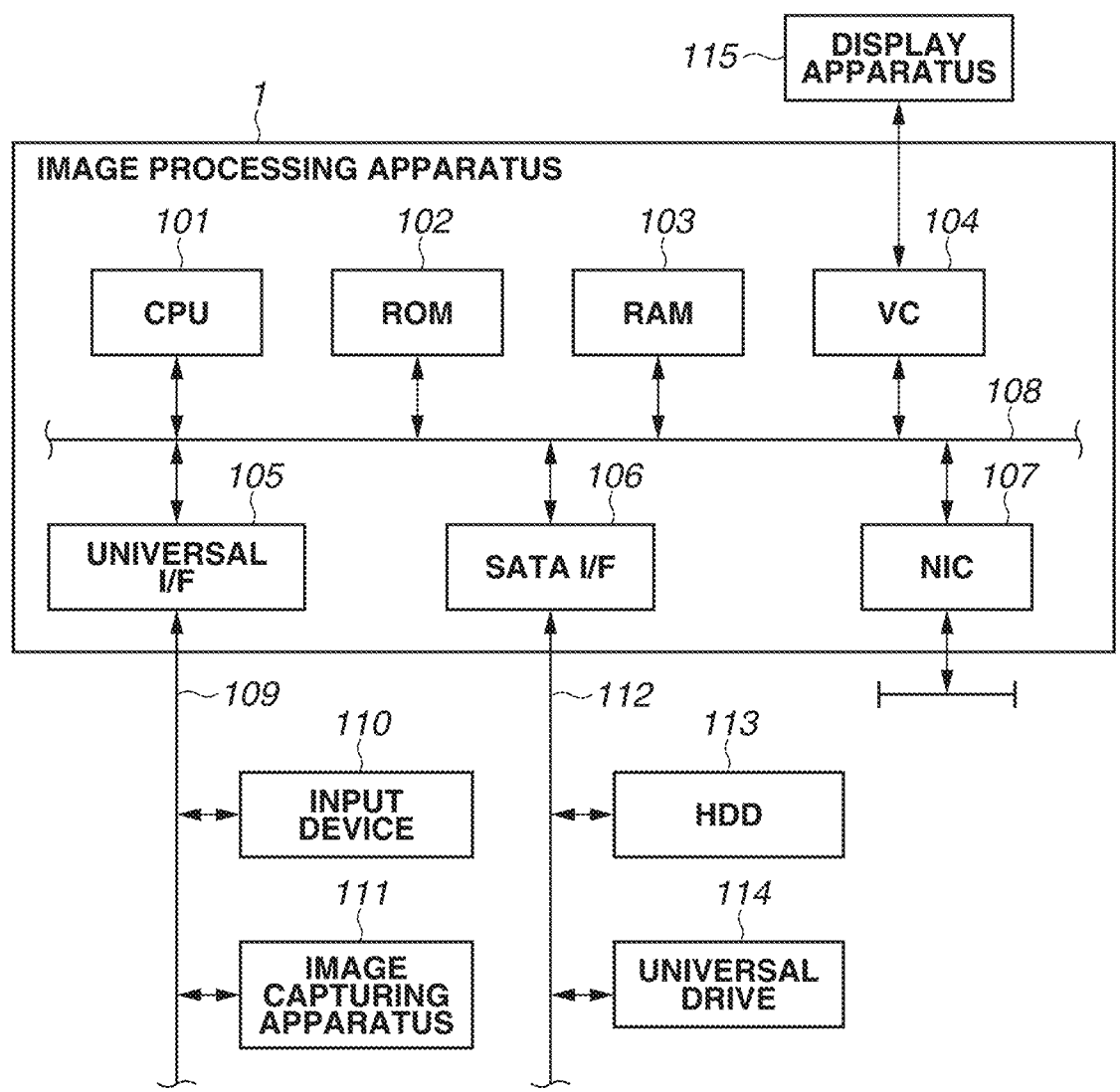
FIG. 1 is a block diagram illustrating an example of a hardware configuration of an image processing apparatus.

FIG. 1 is a block diagram illustrating a hardware configuration of an image processing apparatus 1. The image processing apparatus 1 includes a central processing unit (CPU) 101, a read only memory (ROM) 102, and a random access memory (RAM) 103. The image processing apparatus 1 also includes a video card (VC) 104, a universal interface (I/F) 105, A serial advanced technology attachment (SATA) I/F 106, and a network interface card (NIC) 107. The CPU 101 uses the RAM 103 as a work memory and performs an operating system (OS) and various programs stored in the ROM 102 and a hard disk drive (HDD) 113. The CPU 101 controls the constituent elements via a system bus 108.

A program code stored in the ROM 102 or the HDD 113 is loaded on the RAM 103, and the CPU 101 performs the program code to implement the processing illustrated in a flowchart described below.

A display apparatus 115 is connected to the VC 104. Input device(s) 110, such as a mouse and/or a keyboard, and an image capturing apparatus 111 are connected to the universal I/F 105 via a serial bus 109. The HDD 113 and a universal drive 114 for reading and writing various recording media are connected to the SATA I/F 106 via a serial bus 112. The NIC 107 outputs and receives information to/from an external apparatus. The CPU 101 uses various recording media mounted on the HDD 113 and the universal drive 114 as storage areas for various types of data. The CPU 101 displays a graphical user interface (GUI) provided by a program on the display apparatus 115, and receives information such as user instructions accepted via the input device(s) 110.

<Hardware Configuration of Display Apparatus>

Figure 2:
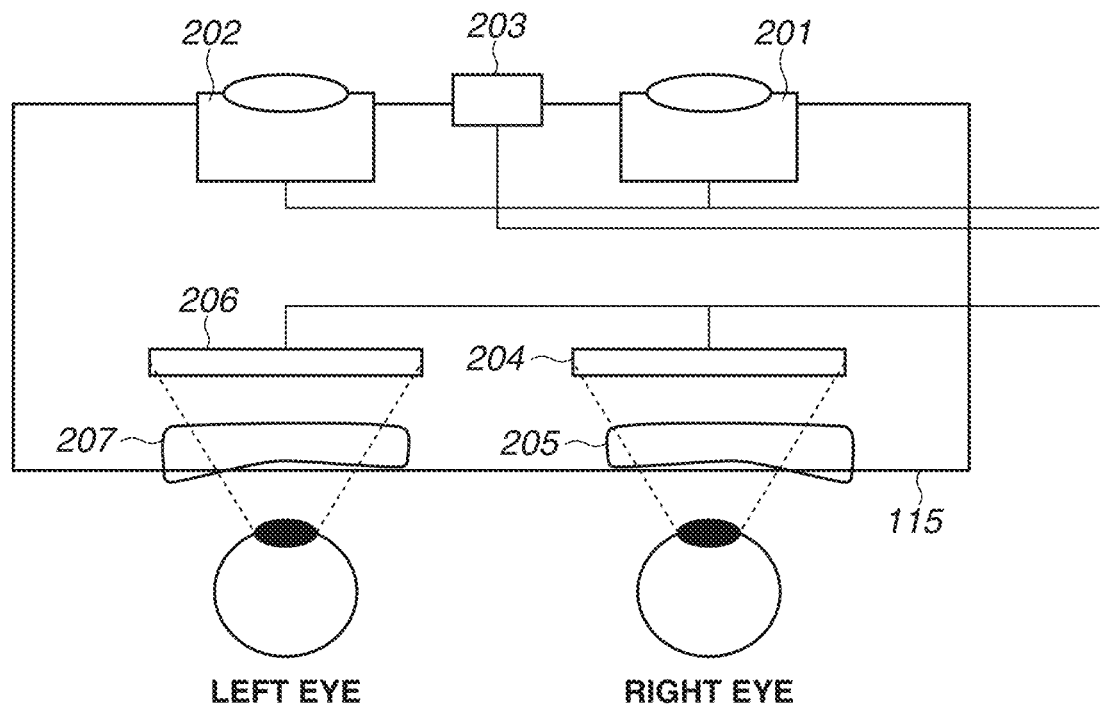
FIG. 2 is a diagram illustrating an example of a hardware configuration of a display apparatus.

FIG. 2 is a diagram illustrating a hardware configuration of the display apparatus 115. The display apparatus 115 is, for example, a video see-through head-mounted display (HMD). The display apparatus 115 includes red-green-blue (RGB) cameras 201 and 202, a distance sensor 203, displays 204 and 206, and eye lenses 205 and 207. The RGB cameras 201 and 202 are cameras that implement inside-out position tracking of the display apparatus 115. The RGB camera 201 corresponds to a right eye line-of-sight direction, and the RGB camera 202 corresponds to a left eye line-of-sight direction. Each of the RGB cameras 201 and 202 includes an inertial measurement unit (IMU) such as a gyroscope or an acceleration sensor (not illustrated). The distance sensor 203 includes a light detection and ranging (LiDAR) sensor for acquiring depth information.

The displays 204 and 206 are display panels for displaying images. Each of the displays 204 and 206 includes a liquid crystal panel or an organic electro-luminescence (EL) panel. The display 204 is a display for the right eye. The display 204 is an example of a first display unit. The display 206 is a display for the left eye. The display 206 is an example of a second display unit. Hereinafter, the display 204 may be called a right display 204, and the display 206 may be called a left display 206.

The eye lenses 205 and 207 are arranged between the displays 204 and 206 and the eyes. The user observes an enlarged virtual image of display images displayed on the displays 204 and 206 through the eye lenses 205 and 207. The right eye lens 205 is arranged in front of the right display 204, and the left eye lens 207 is arranged in front of the left display 206. The display apparatus 115 is mounted on the user's head, and the user observes an enlarged virtual image of a left eye display image with the left eye and an enlarged virtual image of a right eye display image with the right eye. The image processing apparatus 1 performs processing for generating the left eye display image and the right eye display image, and displays these images on the right display 204 and the left display 206. At this time, appropriate parallax between the right eye display image and the left eye display image is provided, thus providing visual perception with a sense of depth to the user. The display apparatus 115 does not necessarily have to be a video see-through HMD, and may be a tablet terminal, such as a smartphone or a display apparatus, which is not a head-mounted type. The hardware configuration of the display apparatus 115 is not limited to the above, and the image processing apparatus 1 and the HDD 113 may be included in the display apparatus 115.

<Functional Configuration of Image Processing Apparatus>

Figure 3:
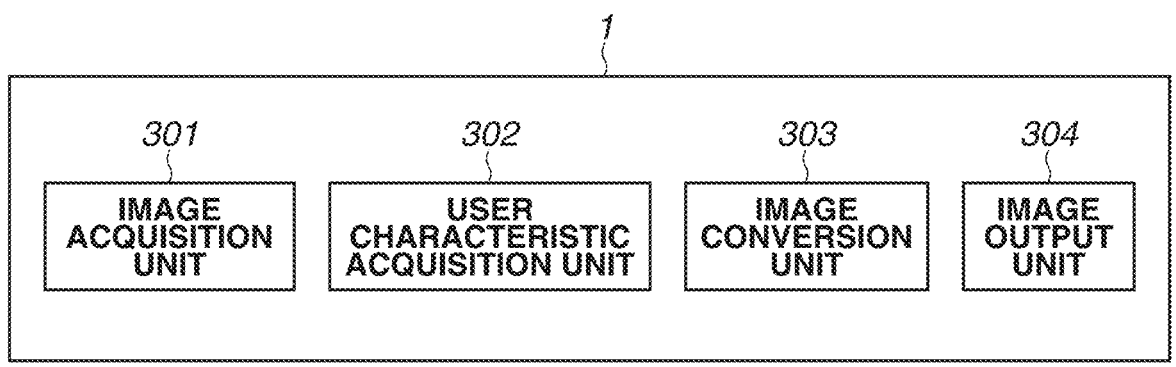
FIG. 3 is a block diagram illustrating an example of a functional configuration of the image processing apparatus.

FIG. 3 is a block diagram illustrating a functional configuration of the image processing apparatus 1. The CPU 101 uses the RAM 103 as a work memory to implement the functional configuration illustrated in FIG. 3 by reading and performing a program stored in the ROM 102 or the HDD 113. Not all of the below-described processing has to be performed by the CPU 101, and the image processing apparatus 1 may be configured so that all or part of the processing is performed by one or a plurality of processing circuits other than the CPU 101.

The image processing apparatus 1 functions as an image acquisition unit 301, a user characteristic acquisition unit 302, an image conversion unit 303, and an image output unit 304.

The image acquisition unit 301 acquires input images to be displayed on the right display 204 and the left display 206 from the HDD 113 and/or the external apparatus. FIGS. 4A and 4B illustrate examples of input images.

In FIG. 4A, a parallax image 402 to be displayed on the right display 204 and a parallax image 403 to be displayed on the left display 206 are combined to form one input image 401. In a case where the right display 204 and the left display 206 are integrated in a display device, the image acquisition unit 301 may acquire an input image with integrated right and left images.

In FIG. 4B, the right eye input image 402 is a parallax image displayed on the right display 204, and the left eye input image 403 is a parallax image displayed on the left display 206. In a case where the right display 204 and the left display 206 are included in separate display devices, or in a case where data image-captured by a right eye camera and data image-captured by a left eye camera are separately acquired, the image acquisition unit 301 may acquire input images from the respective right and left cameras.

The user characteristic acquisition unit 302 acquires color vision characteristics that represent a difference in color appearance between the user's right and left eyes. The color vision characteristics represent a difference in color appearance between the right and left eyes as a difference between coordinate values in a CIE L-star-a-star-b-star (L*a*b*) color space standardized by the International Commission on Illumination (CIE). Hereinafter, the color vision characteristics representing a difference in color appearance between the user's right and left eyes is also called a color appearance difference between the right and left eyes.

The image conversion unit 303 selects, from color conversion information stored in the ROM 102, a color conversion parameter corresponding to the color appearance difference between the right and left eyes acquired by the user characteristic acquisition unit 302, and performs color conversion on the input image with the selected color conversion parameter. In the present exemplary embodiment, the image conversion unit 303 performs color conversion on the right eye input image, and does not perform color conversion on the left eye input image.

The image output unit 304 outputs image data having been subjected to the color conversion by the image conversion unit 303, and an input image to the display apparatus 115. In the present exemplary embodiment, the image output unit 304 outputs the right eye input image having been subjected to the color conversion, and the left eye input image to the display apparatus 115.

<Processing Executed by Image Processing Apparatus>

FIG. 5 is a flowchart illustrating processing that is performed by the image processing apparatus 1. Hereinafter, each step (process) is expressed by a reference numeral prefixed with a symbol "S".

In step S501, the CPU 101 displays a user interface (UI) described below in FIG. 7 on the displays 204 and 206 of the display apparatus 115.

In step S502, the CPU 101 acquires color vision characteristics of the user. Herein, the color vision characteristics represent a color appearance difference between the right and left eyes. A specific acquisition method for the color appearance difference between the right and left eyes will be described below.

In step S503, the CPU 101 acquires a right eye input image and a left eye input image.

In step S504, the CPU 101 performs color conversion on the right eye input image acquired in step S503 by using the color conversion parameter corresponding to the user's color vision characteristics acquired in step S502. In the present exemplary embodiment, the right eye input image is to be subjected to color conversion from among the right eye input image and the left eye input image. However, the left eye input image may be subjected to color conversion. In order to shift color of the input images to a color direction suitable for the color vision characteristics, the CPU 101 may perform color conversion on both of the right eye input image and the left eye input image.

In step S505, the CPU 101 outputs conversion image generated in step S504 and the left eye input image 403 acquired in step S503 to the display apparatus 115.

A series of processing illustrated in this flowchart is then ended.

<Acquisition of Color Vision Characteristics>

A method of acquiring a color appearance difference between the user's right and left eyes is now described. In the present exemplary embodiment, the user characteristic acquisition unit 302 acquires a color appearance difference between the user's right and left eyes based on a user's evaluation result with respect to a color chart on the UI displayed on the right and left displays 204 and 206. FIG. 7 illustrates a display example of the UI. A color in a color chart on the UI displayed on either the right display 204 or the left display 206 is fixed, and a color in the color chart displayed on the other is changeable.

Figure 6:
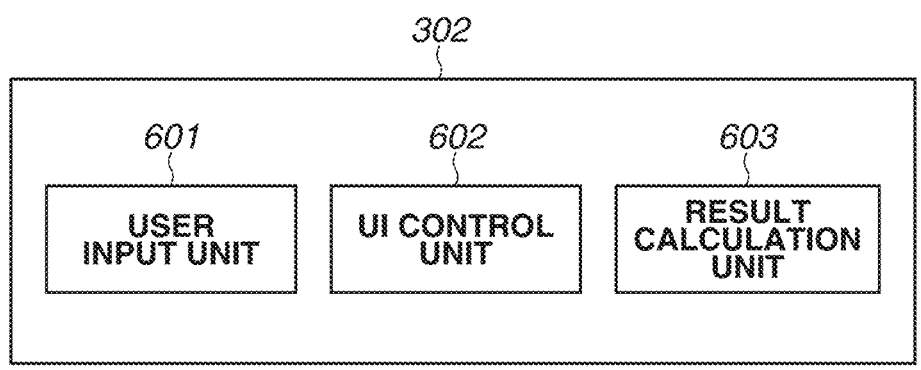
FIG. 6 is a block diagram illustrating details of a user characteristic acquisition unit.

FIG. 6 is a diagram schematically illustrating a functional configuration of the user characteristic acquisition unit 302.

The user characteristic acquisition unit 302 functions as a user input unit 601, a UI control unit 602, and a result calculation unit 603. Herein, the exemplary embodiment using L*a*b* values will be described.

The user input unit 601 receives a user instruction to, for example, change a color on the color chart on the UI. The user input unit 601 may accept L*a*b* values themselves or increase/decrease values of the L*a*b* values in association with an operation performed on the input device(s) 110 such as a mouse, a keyboard, and/or a controller of the HMD. For use of the keyboard, for example, right, left, up, down, page-up, and page-down keys may be respectively associated with +a*, −a*, +b*, −b*, +L*, and −L*. Further, an item may be selected from L*, a*, and b* and only the selected item may be made modifiable. When display color of the color chart is modified according to the color modification instruction issued by the user, the user input unit 601 receives input indicating whether a color appearance difference between the right and left color charts is acceptable.

The UI control unit 602 controls display of the UI for acquiring a color appearance difference between the user's right and left eyes. Specifically, the UI control unit 602 calculates color signal values after modification based on the color modification instruction received by the user input unit 601. The UI control unit 602 calculates Red-Green-Blue (RGB) values of a display from the color signal values after the modification. Display color information is used for the calculation of the RGB values. The UI control unit 602 then modifies display color in the color chart using the calculated RGB values.

The result calculation unit 603 stores a color difference between the right and left color charts and a user's evaluation result indicating whether a color appearance difference between the right and left color charts is acceptable in association with each other. The result calculation unit 603 then aggregates the color differences for which color appearance differences are accepted, and calculates a representative value of these color differences as a color appearance difference between the right and left eyes.

<User Interface (UI)>

Subsequently, the UI 701 is described with reference to FIG. 7.

The UI 701 is used for performing color modification setting to a color chart and displaying the color chart with a color modified based on the user instruction. The UI 701 includes a color setting display portion 702 and a result display portion 709. The UI 701 is displayed on the displays 204 and 206 of the display apparatus 115 under the control of the UI control unit 602.

The color setting display portion 702 is initially described. A display specification radio button 703 and spin boxes 704 to 707 are arranged on the color setting display portion 702.

The display specification radio button 703 is used for specifying either the right display 204 or the left display 206 as a display on which color modification is to be performed. The spin boxes 704 to 706 are used for inputting color information for specifying a color direction of the color information. For example, increase/decrease of a value L* is input to the spin box 704, increase/decrease of a value a* is input to the spin box 705, and increase/decrease of a value b* is input to the spin box 706. The spin box 707 is used for inputting color information modification range. Values in the spin boxes 704 to 706 are modified by values specified in the spin boxes.

A button for specifying either the right or left eyes as a user's dominant eye may be provided instead of the display specification radio button 703. The UI control unit 602 may set a display to be subjected to a color modification target based on the user's dominant eye.

Next, the result display portion 709 is described. A color chart display portion 710, evaluation result input buttons 711 and 712, and an end button 713 are arranged on the result display portion 709.

A color chart that has been modified according to a user instruction input to the color setting display portion 702 is displayed on the color chart display portion 710. In a case where a color modification instruction is issued, the UI control unit 602 modifies a color chart displayed on the color chart display portion 710 of a display specified from the right and left displays 204 and 206. The user compares the color chart displayed on the color chart display portion 710 of the left display 206 and the color chart displayed on the color chart display portion 710 of the right display 204, and presses the evaluation result input button 711 when the color appearance difference between the right and left color charts is acceptable. The user presses the evaluation result input button 712 when the color appearance difference between the right and left color charts is not acceptable.

In response to the end button 713 being pressed, the result calculation unit 603 aggregates the color differences between the right and left color charts with the accepted color appearance differences, and calculates a representative value of these color differences as a color appearance difference between the right and left eyes. The result calculation unit 603 may acquire a color appearance difference between the right and left eyes by using a color difference between the right and left color charts at a time when the end button 713 is pressed.

Figure 8:
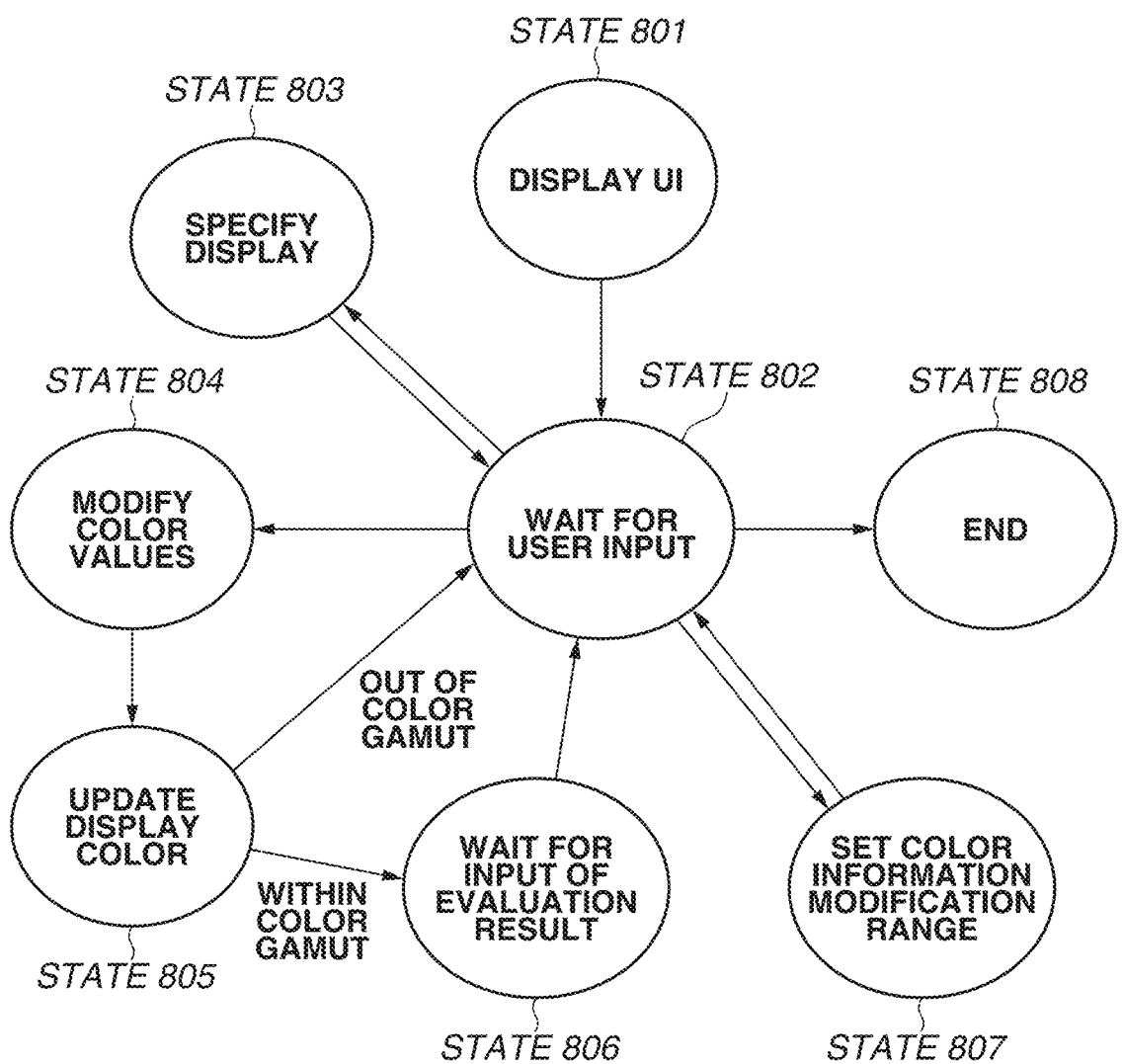
FIG. 8 is a UI state transition diagram.

Next, a user input and control on the display of the UI 701 are described. FIG. 8 is a state transition diagram illustrating transition of a display state of the UI 701.

In state 801, the UI control unit 602 executes initialization of an application activated according to a user instruction, and displays the UI 701. Thereafter, the display state transitions to state 802.

In state 802, the UI control unit 602 displays the color setting display portion 702 and the result display portion 709, and waits for an input from the user. In the initial state, RGB values of the color charts displayed on the right and left displays 204 and 206 are the same. The RGB values of the color charts displayed on the right and left displays 204 and 206 may be different from each other in the initial state. When the user input unit 601 receives the operation performed on the display specification radio button 703, the display state transitions to state 803.

In state 803, the UI control unit 602 sets a display specified with the display specification radio button 703 as a color modification target screen. Thereafter, the display state transitions to state 802. When the user input unit 601 receives modification value(s), the display state transitions to state 804.

In state 804, the UI control unit 602 reflects the color modification value(s) specified by the spin box(es) 704 to 706 on the color signal values (L*a*b* values) of the color chart being displayed to calculate modified color signal values (L*'a*'b*' values). Thereafter, the display state transitions to state 805. The user may input a color modification instruction with an input on keys in association with the respective spin boxes 704 to 706 or an operation on various input interfaces, in addition to the operation on the spin boxes 704 to 706.

In state 805, the UI control unit 602 performs processing for determining whether the modified color signal values (L*'a*'b*' values) fall within a color reproduction range of the display apparatus 115. As a result of determination, if the modified color signal values fall within the color reproduction range, the UI control unit 602 updates display color of the color chart displayed on the color chart display portion 710 of the color modification target display with the RGB values corresponding to the modified color signal values (L*'a*'b*' values). Thereafter, the display state transitions to state 806. If the modified color signal values fall outside the color reproduction range, the UI control unit 602 does not change the display color, and notifies the user that the color falls outside the color gamut. Thereafter, the display state transitions to state 802.

In state 806, the user input unit 601 waits for an evaluation result with respect to the color chart displayed on the result display portion 709. The user visually checks the right and left displays 204 and 206, and evaluates whether the color appearance difference between the right and left color charts is acceptable. When the user input unit 601 accepts the operation performed on either one of the evaluation result input buttons 711 and 712, the UI control unit 602 stores a result of the evaluation (OK or UNACCEPTABLE). Thereafter, the display state transitions to state 802. The image processing apparatus 1 transitions the display state to states 804, 805, and 806 from state 802 in such a manner, which enables the user to perform color adjustment while visually checking the right and left color charts, so that a color appearance difference between the right and left color charts is acceptable.

FIG. 9 is a table illustrating examples of data on color chart evaluation results. An evaluation number is described in a column 901. Columns 902 indicates color modification values specified by the user. The color modification values here represent a color difference between the right and left color charts and are expressed by L*a*b* values. A column 903 indicates an evaluation result indicating acceptance or non-acceptance of color modification values. In a case where the color modification values are accepted, "OK" is recorded in the column 903. In a case where the color modification values are not accepted, "UNACCEPTABLE" is recorded in the column 903.

In state 802, in response to the user input unit 601 receiving the operation performed on the spin box 707, the display state transitions to state 807. In state 807, the UI control unit 602 sets the color information modification range input to the spin box 707. Then, the display state transitions to state 802.

<Display Color Modification Processing>

Figure 10:
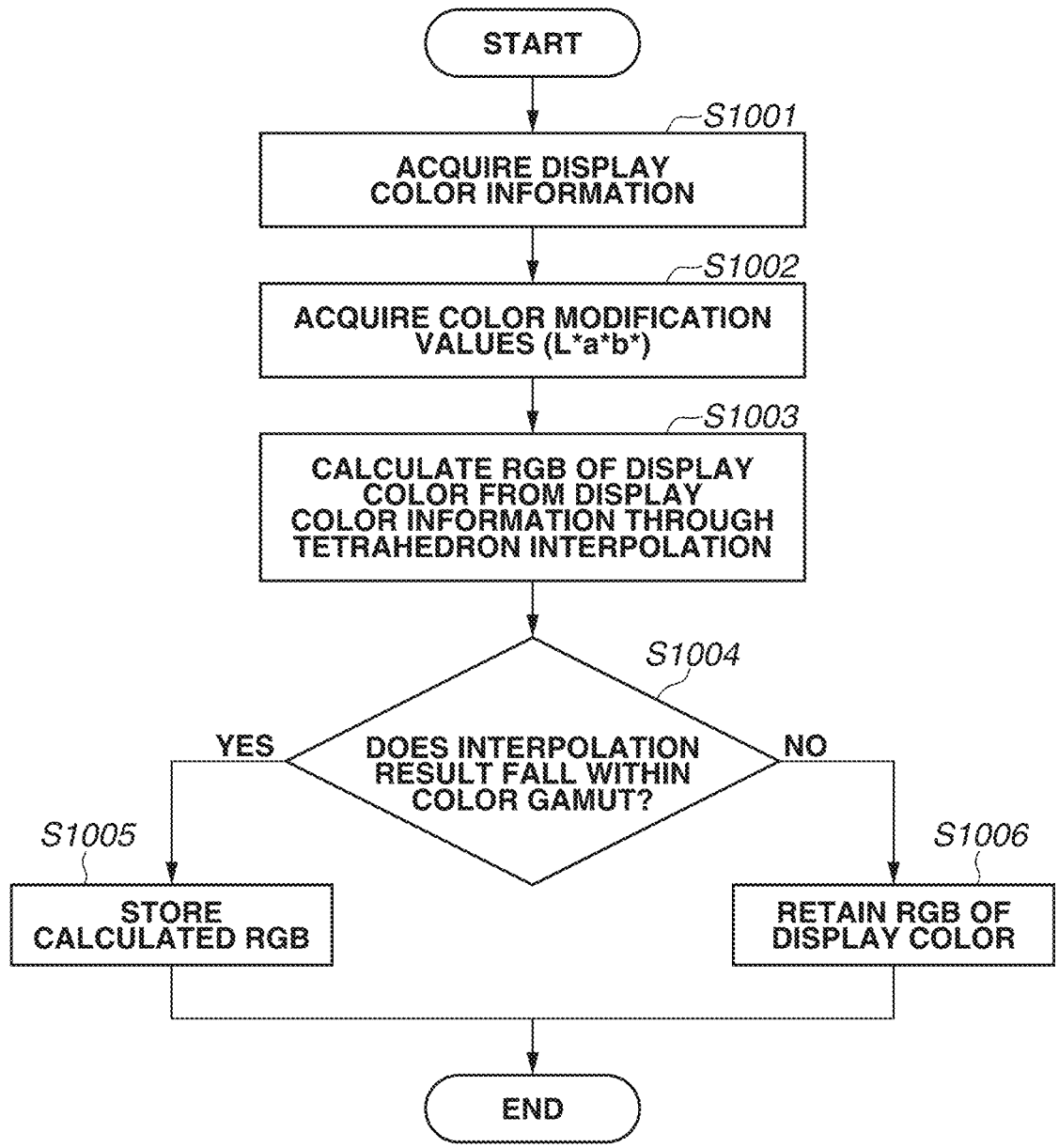
FIG. 10 is a flowchart illustrating processing for modifying display color.

FIG. 10 is a flowchart illustrating processing for modifying display color(s) of the color chart by using modified color signal values (L*'a*'b*' values) performed in state 805.

In step S1001, the CPU 101 acquires display color information. Here, a description is provided of an example in which a three-dimensional look-up table (3D_LUT) is used as display color information. Display color information described in a one-dimensional LUT (1D_LUT) and matrix, or display color information described in gamma (γ) conversion and matrix may also be used. FIG. 11 is a diagram schematically illustrating a 3D_LUT. A data number is described in a column 1101. Values L*, a*, and b* are described in columns 1102. Values R, G, and B of a display, corresponding to the values L*, a*, and b*, are described in columns 1103. In FIG. 11, N pieces of data in each of L*, a*, and b* axes, specifically, 3N pieces of data in total, are stored in the 3D_LUT.

In step S1002, the CPU 101 acquires color modification values specified by the user.

In step S1003, the CPU 101 calculates RGB values corresponding to the color modification values acquired in step S1002 by performing tetrahedron interpolation using the 3D_LUT acquired in step S1001.

In step S1004, the CPU 101 determines whether the RGB values acquired as a result of tetrahedron interpolation fall within a color reproduction range. If the acquired RGB values fall within the color reproduction range (YES in step S1004), the processing proceeds to step S1005. If the acquired RGB values fall outside the color reproduction range (NO in step S1004), the processing proceeds to step S1006.

In step S1005, the CPU 101 changes display color(s) in the color chart displayed on the color chart display portion 710 of the specified display to the calculated RGB values, and stores the calculated RGB values.

In step S1006, the CPU 101 notifies the user that color falls outside the color gamut, and does not change the display color of the color chart on the color chart display portion 710 but retains the display color.

A series of processing illustrated in this flowchart is then ended.

<Processing for Calculating Color Appearance Difference between the Right and Left Eyes>

Figure 12:
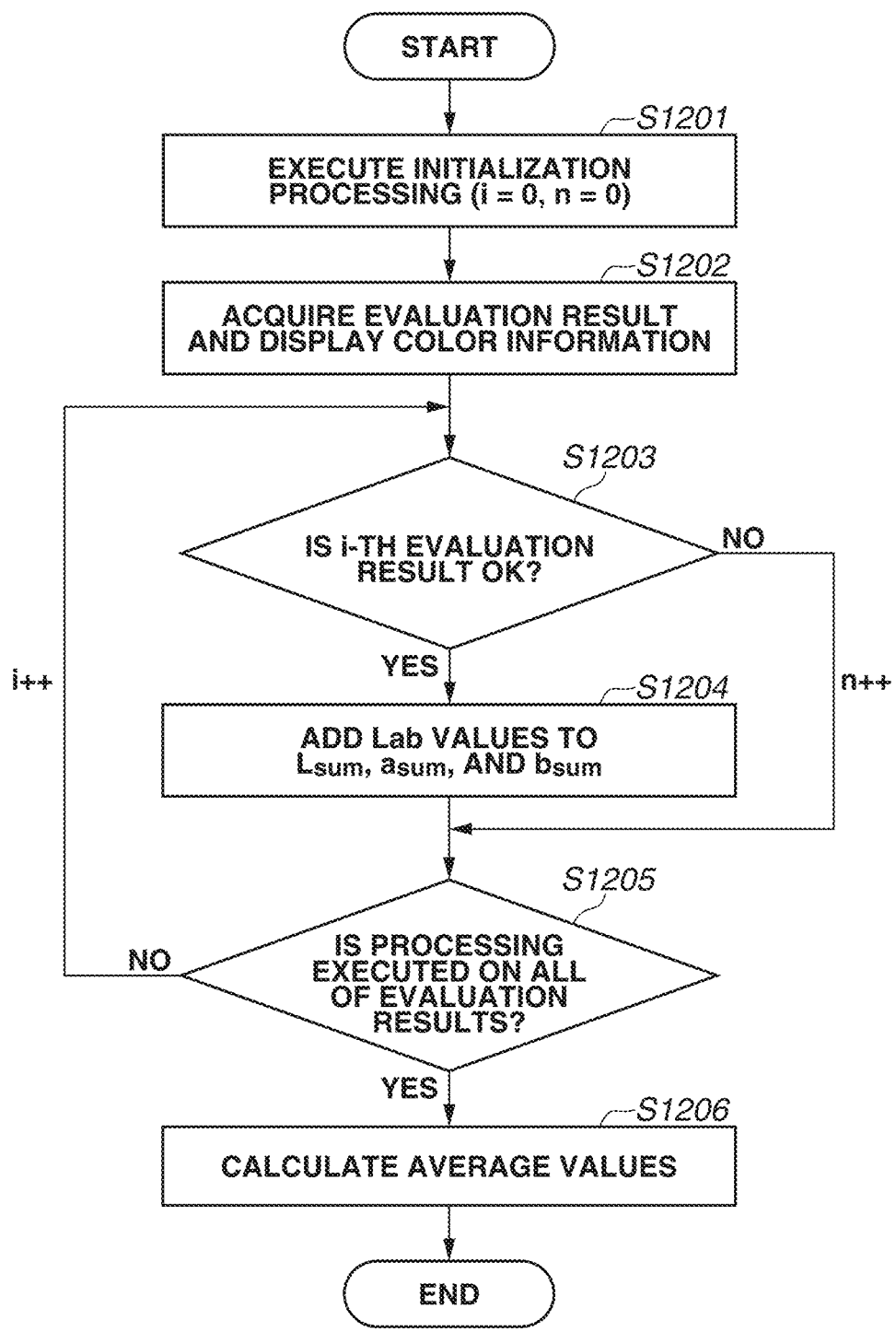
FIG. 12 is a flowchart illustrating processing for calculating a color appearance difference between the right and left eyes.

FIG. 12 a flowchart illustrating processing for aggregating color differences between accepted right and left color charts and calculating a representative value of the aggregated color differences as a color appearance difference between the right and left eyes.

In step S1201, the CPU 101 performs initialization processing to initialize variable numbers "i" (evaluation number) and "n" (the number of times of addition) to 0 (i=1, n=0).

In step S1202, the CPU 101 acquires the i-th color modification values and a result of evaluation of the i-th color modification values from data on color chart evaluation results illustrated in FIG. 9.

In step S1203, the CPU 101 determines whether the i-th evaluation result is OK (acceptable). If the evaluation result is "OK" (YES in step S1203), the processing proceeds to step S1204. If the evaluation result is "UNACCEPTABLE" (NO in step S1203), the processing proceeds to step S1205.

In step S1204, the CPU 101 adds the L'a*b* values in association with an i-th evaluation result to the variable numbers $L_{sum}$, $a_{sum}$, and $b_{sum}$ representing total values, respectively. The CPU 101 increments n representing the number of times of addition.

In step S1205, the CPU 101 determines whether the processing is performed on all of the evaluation results. If the CPU 101 determines that the processing is performed on all of the evaluation results (YES in step S1205), the processing proceeds to step S1206. If there is any unprocessed evaluation result (NO in step S1205), the CPU 101 increments i representing the evaluation number, and advances the processing to step S1203.

In step S1206, the CPU 101 calculates average values $L_{ave}$, $a_{ave}$, and $b_{ave}$ as the color appearance difference between the right and left eyes with the following Equations (1).

$$L_{ave} = \frac{L_{sum}}{n}$$
$$a_{ave} = \frac{a_{sum}}{n}$$
$$b_{ave} = \frac{b_{sum}}{n}$$
(1)

A series of processing illustrated in this flowchart is ended. Through the processing illustrated in the above-described flowchart, an average value of the color differences between the right and left color charts with the color appearance differences accepted by the user (OK) can be acquired as a color appearance difference between the user's right and left eyes. A color appearance difference between the user's right and left eyes is not limited in particular, and can be any value which is acquirable based on a color difference between the right and left color charts with the color appearance difference accepted by the user when color charts in different colors are displayed on the displays for the right and left eyes.

<Processing for Selecting Color Conversion Parameters>

Figure 13:
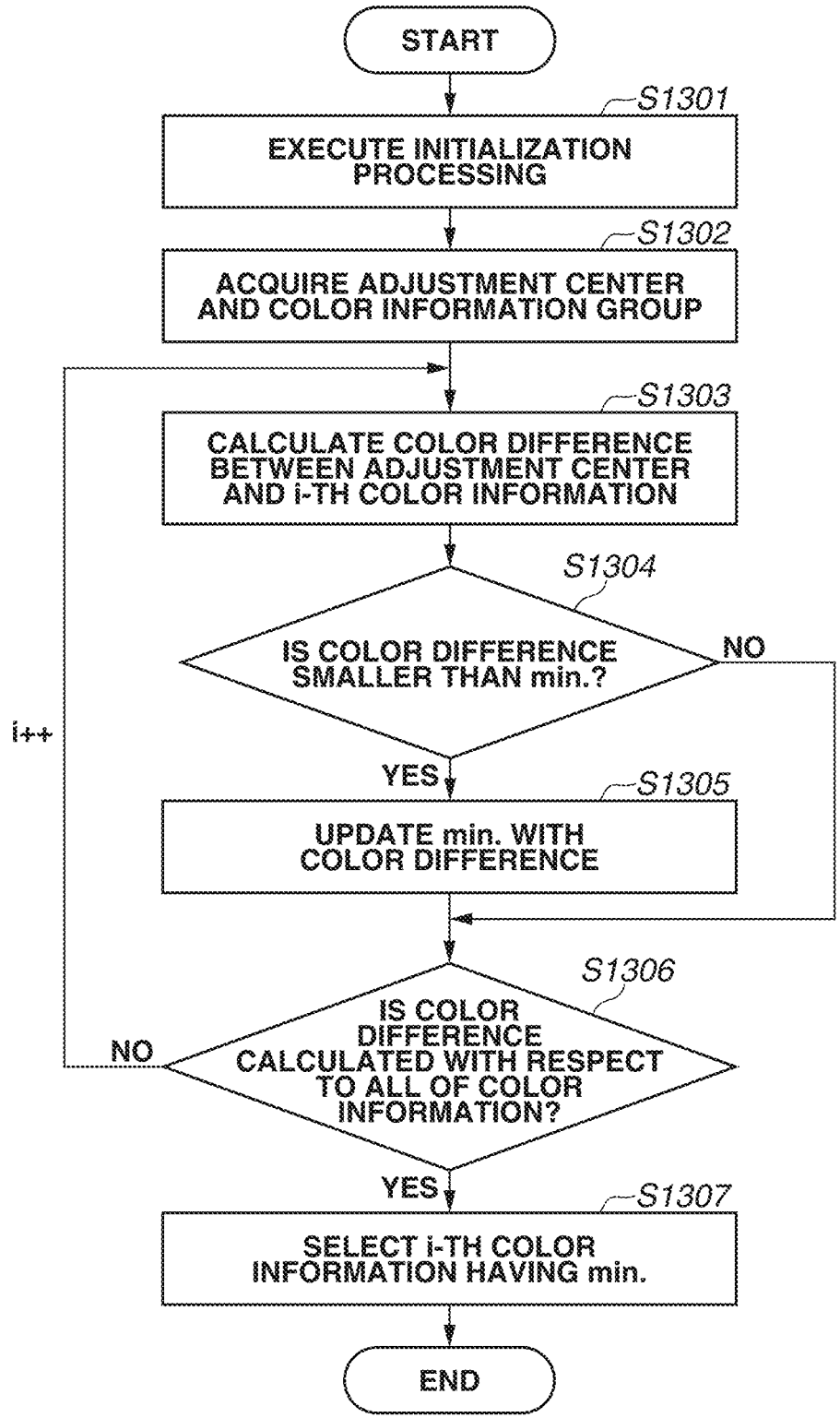
FIG. 13 is a flowchart illustrating processing for selecting a color conversion parameter.

Processing for selecting color conversion parameters corresponding to the average values $L_{ave}$, $a_{ave}$, and $b_{ave}$ calculated through the processing illustrated in the flowchart in FIG. 12 is described. FIG. 13 is a flowchart illustrating the processing for selecting color conversion parameters.

In step S1301, the CPU 101 performs initialization processing to initialize the variable numbers "i" (a color conversion parameter number) and "min." (a minimum number) to initial values (i=1, min.=0).

In step S1302, the CPU 101 acquires color conversion information previously stored and the average values $L_{ave}$, $a_{ave}$, and $b_{ave}$ calculated through the processing illustrated in the flowchart in FIG. 12.

FIG. 14 is a table illustrating an example of the color conversion information. A column 1401 indicates a color conversion parameter number. Columns 1402 indicate coordinate values in the L'a*b* space. Here, color conversion parameters are prepared for predetermined L*a*b* coordinates. For example, in an a-b plane having a center a=0 and b=0, the color conversion parameters are prepared at a delta (Δ) interval of 1.0 in the a-axis and b-axis directions.

A column 1403 indicates a file representing color conversion parameters with the L*a*b* values serving as an adjustment center.

FIG. 15 is a table illustrating examples of color conversion parameters. A column 1501 indicates a data number. Columns 1502 indicate coordinate values in the RGB space. Columns 1503 indicates RGB values of a display corresponding to that coordinate values in the RGB space. In FIG. 15, N pieces of color conversion parameters for each of R, G, and B axes, specifically, 3N pieces of color conversion parameters in total, are stored in the table.

In step S1303, the CPU 101 calculates a color difference between the adjustment center values $L_{ave}$, $a_{ave}$, and $b_{ave}$, and values ($L_i$, $a_i$, and $b_i$) in the columns 1402 of the i-th color conversion parameter in FIG. 14. A color difference $\Delta E_i$ is calculated using the following equation (2).

$$\Delta E_i = \sqrt{(L_i + L_{ave})^2 + (a_i + a_{ave})^2 + (b_i + b_{ave})^2}$$
(2)

In step S1304, the CPU 101 compares the color difference $\Delta E_i$ with the minimum value min. In a case where the $\Delta E_i$ is smaller than the min. (YES in step S1304), the processing proceeds to step S1305. In a case where the $\Delta E_i$ is greater than the min. (NO in step S1304), the processing proceeds to step S1306.

In step S1305, the CPU 101 updates the min. with $\Delta E_i$.

In step S1306, the CPU 101 determines whether a color difference from the adjustment center values $L_{ave}$, $a_{ave}$, and $b_{ave}$ is calculated for all of the color conversion parameters. If the CPU 101 determines that the color difference is calculated for all of the color conversion parameters (YES in step S1306), the processing proceeds to step S1307. If the CPU 101 determines that the color difference is calculated for not all of the color conversion parameters (NO in step S1306), the CPU 101 increments the color conversion parameter number i, and advances the processing to step S1302.

In step S1307, the CPU 101 selects the i-th color conversion parameters with the updated min.

A series of processing illustrated in this flowchart is ended.

Through the processing illustrated in the above-described flowchart, it is possible to select color conversion parameters corresponding to the color appearance difference between the user's right and left eyes. In step S504, the use of the color conversion parameter selected as described above enables color conversion with a center shifted to a position corresponding to the color appearance difference between the user's right and left eyes.

According to the above-described present exemplary embodiment, colors of images are controlled so that color appearances of the right and left displays match each other based on the color appearance difference between the user's right and left eyes.

A second exemplary embodiment of the present disclosure will be described below. In the method of acquiring user's color vision characteristics according to the first exemplary embodiment, color modification is performed on the color chart displayed on the specified display, and the user evaluates the color appearance difference between the color charts displayed on the right and left displays. Accuracy in the evaluation of the color appearance difference varies depending on the arrangement of the color charts. For example, with respect to the color difference ΔE defined by the CIE 1976, it is said that the color difference ΔE of 0.8 to 1.6 can be recognized through a comparison of the color charts arranged next to each other. In the second exemplary embodiment, a variation example of a display method of color charts for evaluating a color appearance difference is described. Descriptions overlapping with the first exemplary embodiment are omitted.

<Configuration of Color Chart Display Portion>

Figure 7:
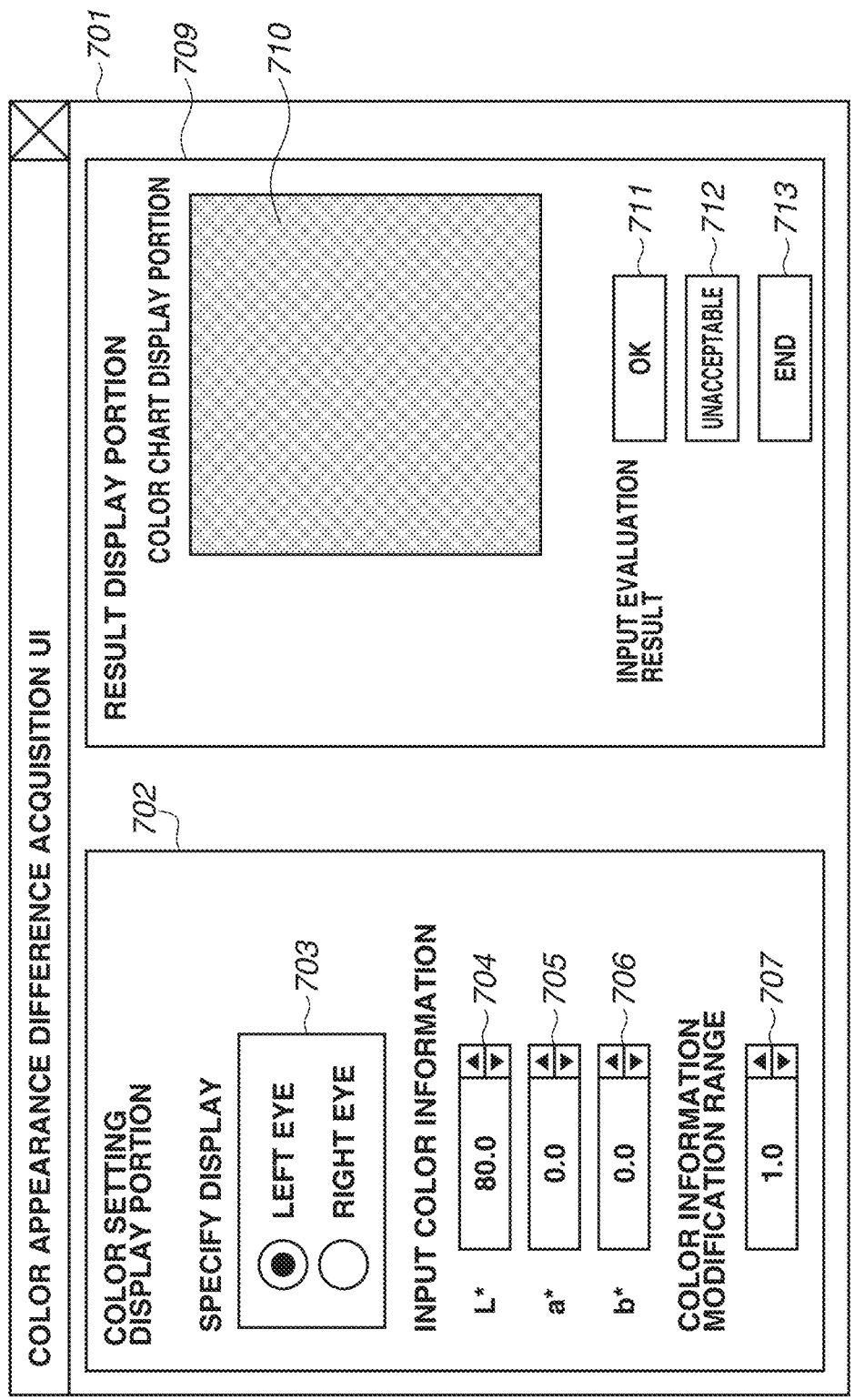
FIG. 7 is a diagram illustrating a display example of a user interface (UI).
Figure 16A:
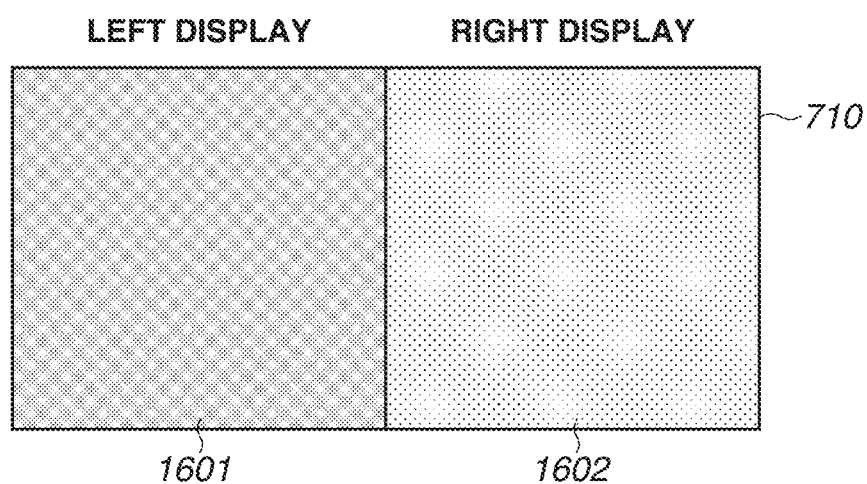
FIGS. 16A to 16K are diagrams illustrating display methods of color charts.

Hereinafter, a configuration example of the color chart display portion 710 of the UI 701 illustrated in FIG. 7 is described. FIGS. 16A and 16K are diagrams illustrating display methods for the color charts.

In the example illustrated in FIG. 16A, from among two regions in the color chart display portion 710, arranged next to each other in the horizontal direction, a left region 1601 is displayed on the left display 206, and a right region 1602 is displayed on the right display 204. In FIG. 16A, while the sizes of the regions 1601 and 1602 are the same, the sizes thereof may be different.

Figure 16B:
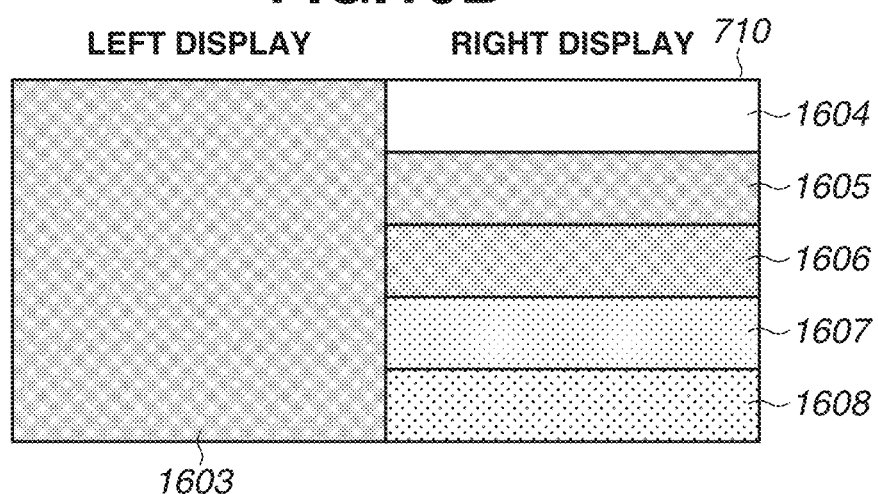

In the example illustrated in FIG. 16B, the region 1602 in FIG. 16A is divided into five regions 1604 to 1608 in the vertical direction, and color of the regions 1604 to 1608 is modified to be different from each other. A region 1603 in FIG. 16B is displayed on the left display 206, and the regions 1604 to 1608 are displayed on the right display 204. For example, a color chart with a modified color is displayed on the region 1604, and a color chart with a color modified by a value +a in comparison to the color chart in the region 1604 is displayed on the region 1605. Similarly, a color chart with the color modified by a value-a in comparison to the color chart in the region 1604 is displayed on the region 1606, a color chart with the color modified by a value +b in comparison to the color chart in the region 1604 is displayed on the region 1607, and a color chart with the color modified by a value-b in comparison to the color chart in the region 1604 is displayed on the region 1608. In this way, a plurality of color modification results is displayed on the regions 1604 to 1608 at the same time. Here, while longitudinal sizes of the regions 1604 to 1608 are the same and also equivalent to a predetermined viewing angle, the longitudinal sizes thereof may be different.

Figure 16C:
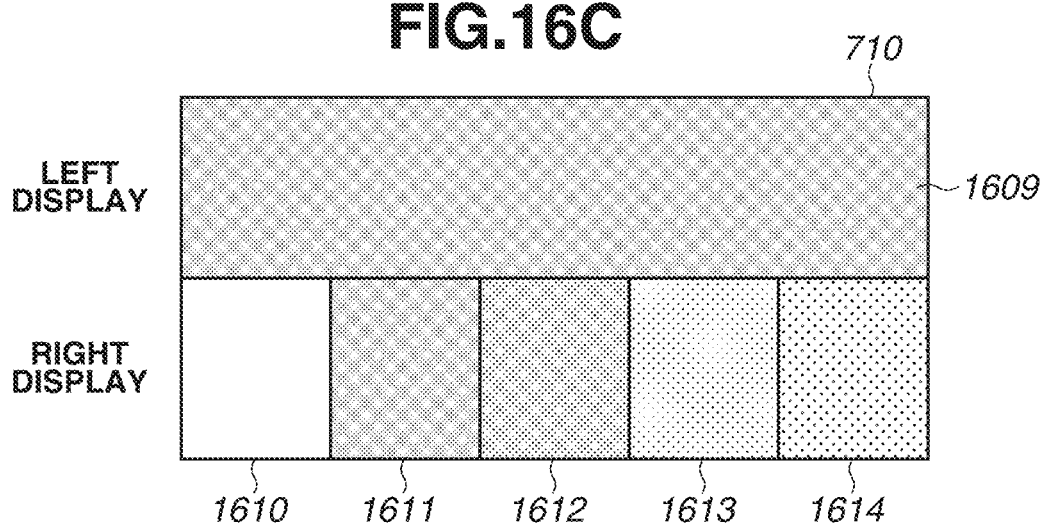

In the example illustrated in FIG. 16C, from among two regions in the color chart display portion 710, arranged next to each other in the vertical direction, an upper region 1609 is displayed on the left display 206, and a lower region is displayed on the right display 204. The lower region in the color chart display portion 710 is divided into five regions 1610 to 1614, and the regions 1610 to 1614 are displayed in different modified colors. For example, a color chart with a modified color is displayed on the region 1610, and a color chart with the color modified by a value +a in comparison to the color chart in the region 1610 is displayed on the region 1611. Similarly, a color chart with the color modified by a value-a in comparison to the color chart in the region 1610 is displayed on the region 1612, a color chart with the color modified by a value +b in comparison to the color chart in the region 1610 is displayed on the region 1613, and a color chart with the color modified by a value-b in comparison to the color chart in the region 1610 is displayed on the region 1614. In this way, a plurality of color modification results is displayed on the regions 1610 to 1614 at the same time. Here, while lateral sizes of the regions 1610 to 1614 are the same and also equivalent to a predetermined viewing angle, the lateral sizes thereof may be different.

Figure 16D:
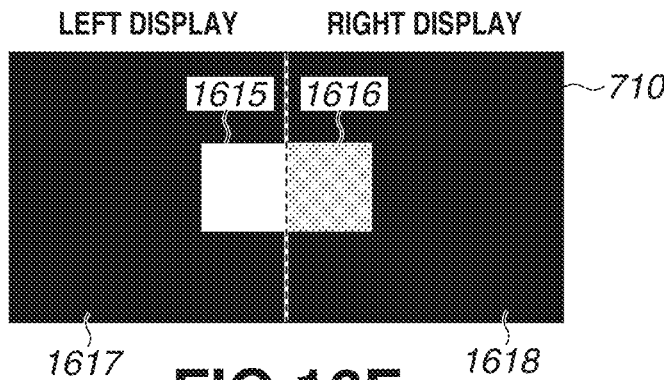

In the example illustrated in FIG. 16D, from among two regions in the color chart display portion 710, arranged next to each other, one region 1615 is displayed on the left display 206, and the other region 1616 is displayed on the right display 204. In this state, sizes of the regions 1615 and 1616 are modified. A background region 1617 is displayed on the left display 206, and a background region 1618 is displayed on the right display 204. Here, while the colors of the background regions 1617 and 1618 are black, other colors may be used. The colors of the background regions 1617 and 1618 can be modified with a user instruction.

Figure 16E:
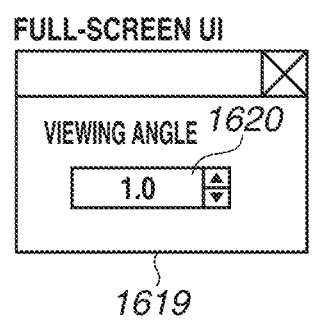

FIG. 16E illustrates a UI 1619 for modifying a size of a region using a viewing angle. A spin box 1620 is used to input information about a viewing angle at which a region is to be displayed. The UI control unit 602 modifies the sizes of the regions 1615 and 1616 using the viewing angle information input to the spin box 1620.

Figure 16F:
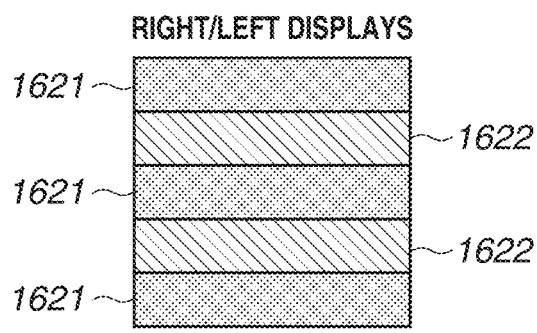

In the example illustrated in FIG. 16F, a region within the color chart display portion 710 is divided into a plurality of regions in the vertical direction, and the divided regions are alternately displayed on the right and left displays 204 and 206. The regions 1621 (grayed portions) are displayed on the left display 206, and the regions 1622 (diagonally shaded portions) are displayed on the right display 204. In FIG. 16F, while a region division are the same and also equivalent to a predetermined viewing angle, the region division sizes may be different. An optional ratio can be used as an area ratio.

Figure 16G:
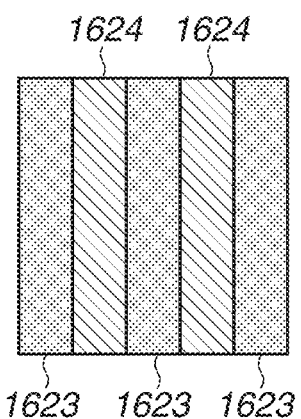

In the example illustrated in FIG. 16G, a region within the color chart display portion 710 is divided into a plurality of regions in the horizontal direction, and the divided regions are alternately displayed on the right and left displays 204 and 206. The regions 1623 (grayed portions) are displayed on the left display 206, and the regions 1624 (diagonally shaded portions) are displayed on the right display 204. In FIG. 16G, while region division sizes are the same and also equivalent to a predetermined viewing angle, the region division sizes may be different. An optional ratio can be used as an area ratio.

Figure 16H:
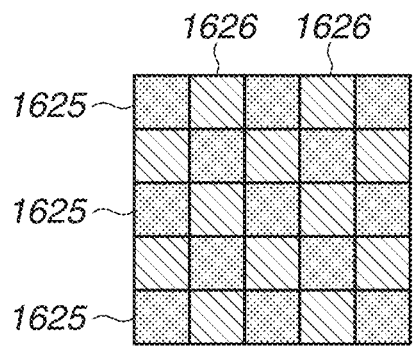

In the example illustrated in FIG. 16H, a region within the color chart display portion 710 is divided into regions in a checkered pattern, and the divided regions are alternately displayed on the right and left displays 204 and 206. The regions 1625 (grayed portions) are displayed on the left display 206, and the regions 1626 (diagonally shaded portions) are displayed on the right display 204. In FIG. 16H, although the region division sizes are the same and also equivalent to a predetermined viewing angle, the region division sizes may be different. An optional ratio can be used as an area ratio.

Figure 16I:
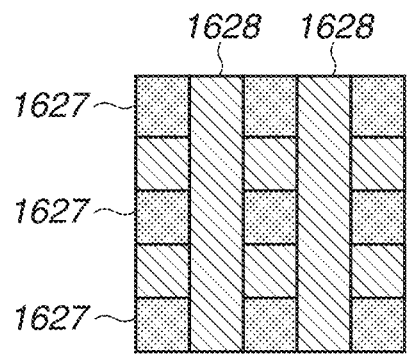

In the example illustrated in FIG. 16I, a region within the color chart display portion 710 is divided into a plurality of regions in the horizontal and vertical directions, and the divided regions are alternately displayed on the right and left displays 204 and 206. The regions 1627 (grayed portions) are displayed on the left display 206, and the regions 1628 (diagonally shaded portions) are displayed on the right display 204. In FIG. 16I, while the region division sizes are the same and also equivalent to a predetermined viewing angle, the region division sizes thereof may be different. An optional ratio can be used as an area ratio.

Figure 16J:
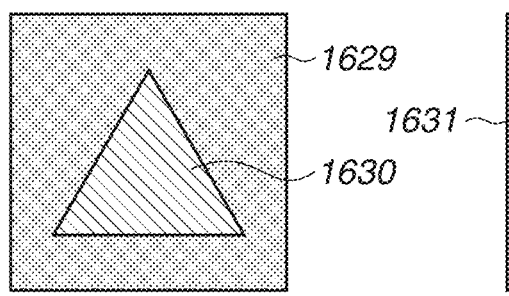
Figure 16K:
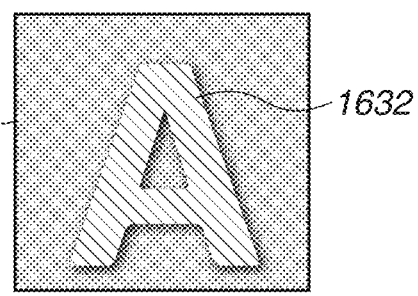

In the example illustrated in FIG. 16J, an optional figure-like region 1630 within the color chart display portion 710 is displayed on the right display 204, and a background region 1629 of the region 1630 is displayed on the left display 206. In FIG. 16J, while the sizes of the region 1630 and the background region 1629 are the same, the sizes thereof may be different.

In the example illustrated in FIG. 16K, an optional character-like region 1632 within the color chart display portion 710 is displayed on the right display 204, and a background region 1631 of the region 1632 is displayed on the left display 206. In FIG. 16K, while the sizes of the region 1632 and the background region 1631 are the same, the sizes thereof may be different.

In the present exemplary embodiment, a color chart arranged on the UI is displayed on the right and left displays in various formats, and color modification is performed on the color chart displayed on a specified display according to the user instruction. In this way, the user can easily determine whether the color appearance difference between the right and left color charts is acceptable, so that the user can match the color appearances of the right and left displays with increased accuracy.

A third exemplary embodiment of the present disclosure will be described below. In the first exemplary embodiment, the user performs color modification of a color chart on a specified display by directly inputting L*a*b* values and increase/decrease values. The user performs color adjustment while visually checking the right and left color charts so that the color appearance difference between the right and left color charts fall within the acceptable range. However, if the user is not familiar with the color adjustment, it may take time to match color appearance of the right and left color charts because the above-described adjustment work takes time and effort. Thus, in the third exemplary embodiment, another mode of the user input unit 601 is described. Descriptions overlapping with the first and the second exemplary embodiments will be omitted.

User Interface (UI)

Figure 17:
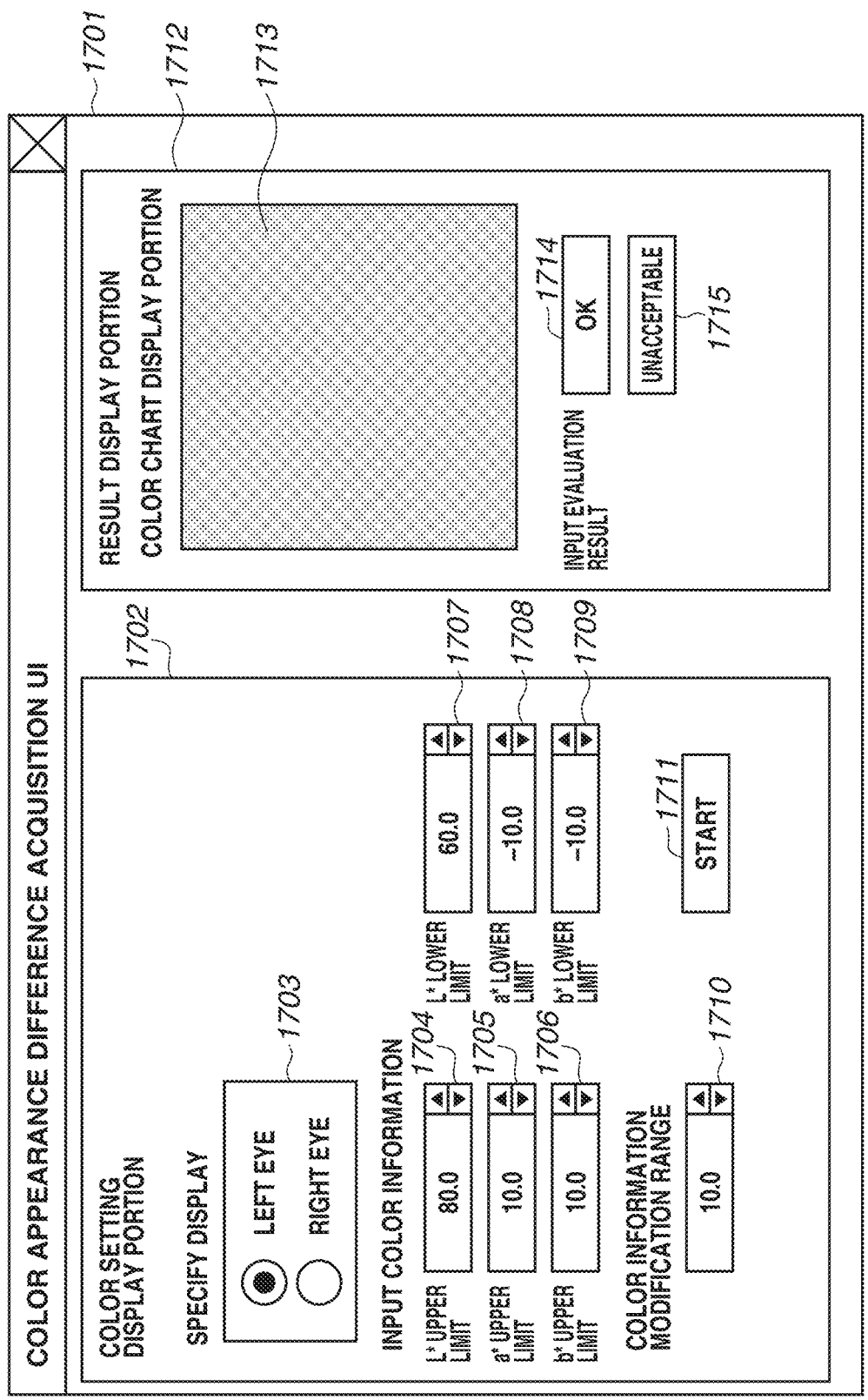
FIG. 17 is a diagram illustrating a display example of a UI.

Initially, a description will be provided, with reference to FIG. 17, of a UI 1701 according to the present exemplary embodiment focusing on the points different from the UI 701 of the first exemplary embodiment. A color setting display portion 1702 of the UI 1701 in FIG. 17 includes spin boxes 1704 to 1709 instead of the spin boxes 704 to 706 in FIG. 7. A display specification radio button 1703 is similar to the display specification radio button 703 in FIG. 7.

Color information for specifying a color information range is input to the spin boxes 1704 to 1709. For example, an upper limit value L* is input to the spin box 1704, an upper limit value of a* is input to the spin box 1705, an upper limit value of b* is input to the spin box 1706, a lower limit value of L* is input to the spin box 1707, a lower limit value of a* is input to the spin box 1708, and a lower limit value of b* is input to the spin box 1709. According to the color information range input to the spin boxes 1704 to 1709 and the color information modification range input to the spin box 1710, the UI control unit 602 acquires an image of a combination of color charts displayed on the right and left displays 204 and 206. The UI control unit 602 may generate the image by acquiring RGB values of a display corresponding to the L'a*b* values through tetrahedron interpolation, or may acquire the image from the HDD 113 where images prepared for various ranges are stored previously.

A start button 1711 is used to start displaying the color charts falling within the color information range input to the spin boxes 1704 to 1709. Evaluation result input buttons 1714 and 1715 are similar to the evaluation result input buttons 711 and 712 illustrated in FIG. 7.

A color chart display portion 1713 displays a color chart with the color modified according to the user instructions input to the color setting display portion 1702. In response to the start button 1711 being pressed, the UI control unit 602 modifies only the color chart display portion 1713 on a display specified from the right and left displays 204 and 206 according to the color information range, and does not modify the color chart display portion 1713 on the other display which is not specified. For example, in response to the start button 1711 being pressed, a display color of the color chart on a display specified from the right and left displays 204 and 206 is consecutively modified within the color information range input to the spin boxes 1704 to 1709, at a predetermined interval, and the user presses either one of the evaluation result input buttons 1714 and 1715 in response to the modification.

Figure 18:
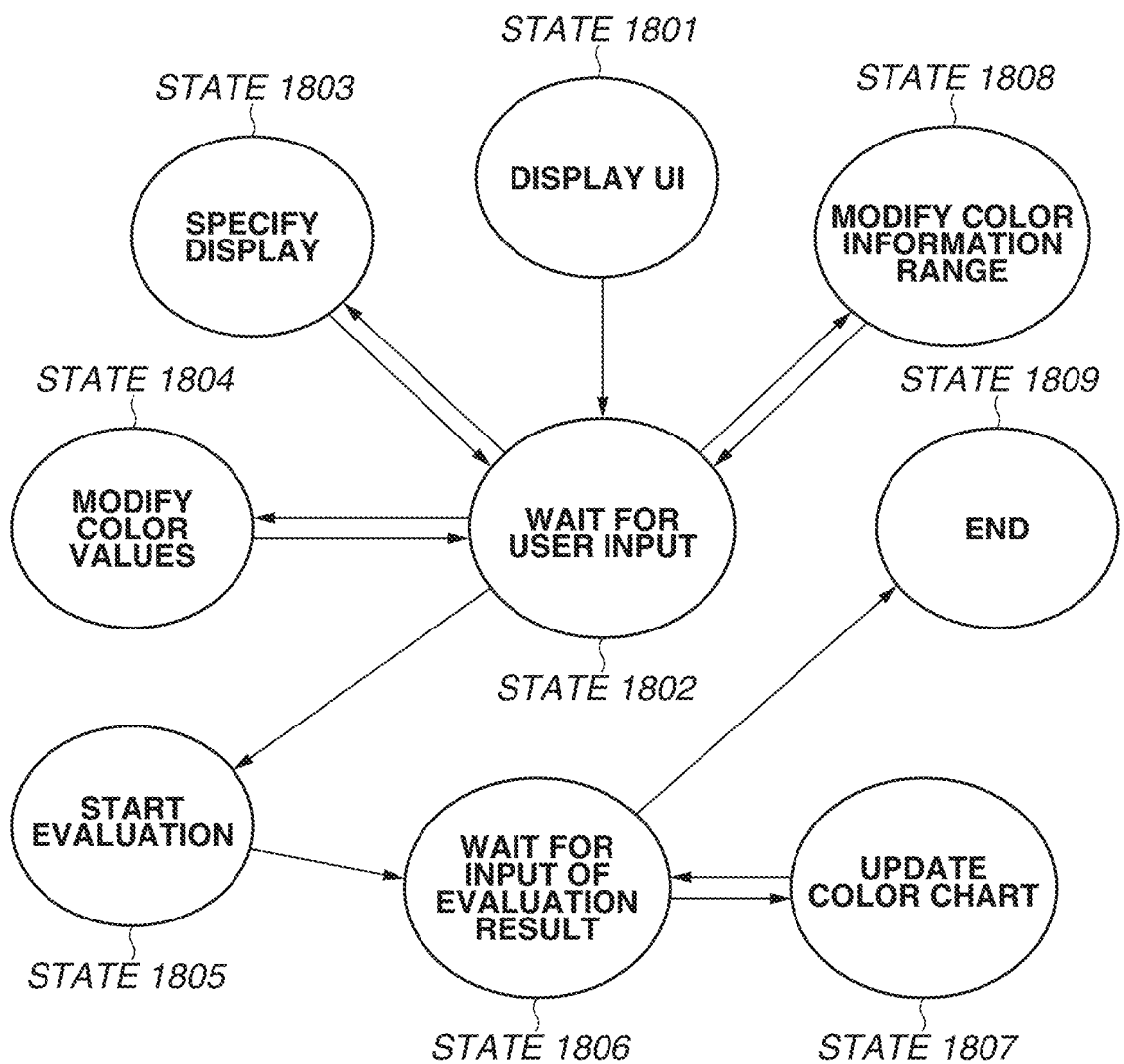
FIG. 18 is a UI state transition diagram.

Next, a user input and control on display of the UI 1701 are described. FIG. 18 is a state transition diagram illustrating transition of a display state of the UI 1701.

In state 1801, the UI control unit 602 performs initialization of an application activated according to a user instruction, and displays the UI 1701. Thereafter, the display state transitions to state 1802.

In state 1802, the UI control unit 602 displays the color setting display portion 1702 and the result display portion 1712, and waits for an input from the user. Thereafter, when the user input unit 601 receives the operation performed on the display specification radio button 1703, the display state transitions to state 1803.

In state 1803, the UI control unit 602 sets a display specified by the display specification radio button 1703 to a color modification target display. Then, the display state transitions to state 1802. Thereafter, in response to the user input unit 601 receiving the color information range input to the spin boxes 1704 to 1709, the display state transitions to state 1804.

In state 1804, the UI control unit 602 stores the color information range. The display state transitions to state 1802. Thereafter, when the user input unit 601 receives the operation performed on the spin box 1710, the display state transitions to state 1808.

In state 1808, the UI control unit 602 stores the color information modification range input to the spin box 1710.

Then, the display state transitions to state 1802. Thereafter, when the user input unit 601 receives the operation performed on the start button 1711, the display state transitions to state 1805.

In state 1805, the UI control unit 602 acquires a plurality of color chart images in accordance with the information retained in states 1804 and 1808. Further, from among the acquired color chart images, the UI control unit 602 displays a first color chart image on the color chart display portion 1713 of a color modification target display, and displays a reference color chart image on the color chart display portion 1713 of the other display. Thereafter, the display state transitions to state 1806.

In state 1806, the user input unit 601 waits for an evaluation result with respect to the color chart displayed on the result display portion 709. The user visually checks the right and left displays and evaluates whether a color appearance difference between the right and left color charts is acceptable. When the user input unit 601 receives the operation performed on either the evaluation result input buttons 1714 or 1715, the UI control unit 602 determines whether the color appearance difference between the right and left color charts is accepted. In response to the evaluation result input button 1714 being pressed, the UI control unit 602 records the color modification values (L*a*b* values) corresponding to the color chart being displayed. In a case where the evaluation result input button 1715 is pressed, the UI control unit 602 performs nothing.

Further, the UI control unit 602 determines whether all of the color chart images acquired in state 1805 are evaluated. In a case where the UI control unit 602 determines that not all of the color chart images are evaluated, the display state transitions to state 1807. In a case where the UI control unit 602 determines that all of the color chart images are evaluated, the display state transitions to state 1809.

In state 1807, the UI control unit 602 updates the color chart image on the color chart display portion 1713 of the color modification target screen to the subsequent color chart image of the color chart images acquired in state 1805. Then, the display state transitions to state 1806.

In state 1809, the result calculation unit 503 calculates an average value from all of the recorded color modification values (L*a*b* values), and outputs the average value as a color appearance difference between the right and left eyes.

In the present exemplary embodiment, the color charts having different colors are subsequentially displayed to let the user evaluate the color appearance difference between the right and left color charts, thus acquiring the user's color vision characteristics. This reduces the user's workload in color adjustment.

A fourth exemplary embodiment of the present disclosure will be described below. A color appearance difference between the right and left eyes is affected by an influence of spectral characteristics of a display. Thus, in the fourth exemplary embodiment, color conversion of the display is performed with the spectral characteristics of the display reflected. Descriptions overlapping with the first to the third exemplary embodiments are omitted.

<Functional Configuration of Image Processing Apparatus>

Figure 19:
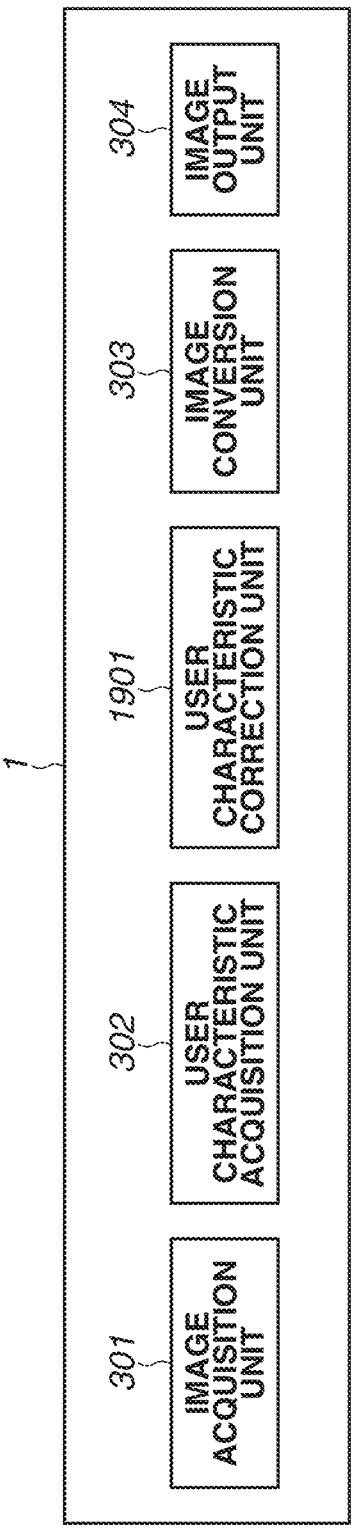
FIG. 19 is a block diagram illustrating an example of a functional configuration of the image processing apparatus.

FIG. 19 is a block diagram illustrating a functional configuration of the image processing apparatus 1. FIG. 19 is different from FIG. 3 in that the image processing apparatus 1 includes a user characteristic correction unit 1901.

The user characteristic correction unit 1901 calculates a correction value for the user's color vision characteristics.

Specifically, the user characteristic correction unit 1901 acquires spectral characteristics of the right and left displays 204 and 206.

For example, spectral radiance at wavelengths of 380 nm to 780 nm is previously measured and used as the spectral characteristics. Information about other spectra may also be used as the spectral characteristics. The user characteristic correction unit 1901 calculates a correction value for the color appearance difference through the below-described processing by using a group of color matching function files stored in the ROM 102, a color appearance difference between the right and left eyes acquired by the user characteristic acquisition unit 302, and spectral characteristics of the displays 204 and 206. For example, a color matching function model generated from a model in the CIE 170-1: Fundamental Chromaticity Diagram with Physiological Axes Part 1 is used as the group of color matching function files. The group of color matching function files is calculated with ages and viewing angles serving as parameters. The image conversion unit 303 selects a color conversion parameter corresponding to the correction value calculated by the user characteristic correction unit 1901, and performs color conversion on the right eye image using the selected color conversion parameter.

<Processing Executed by Image Processing Apparatus>

Figure 20:
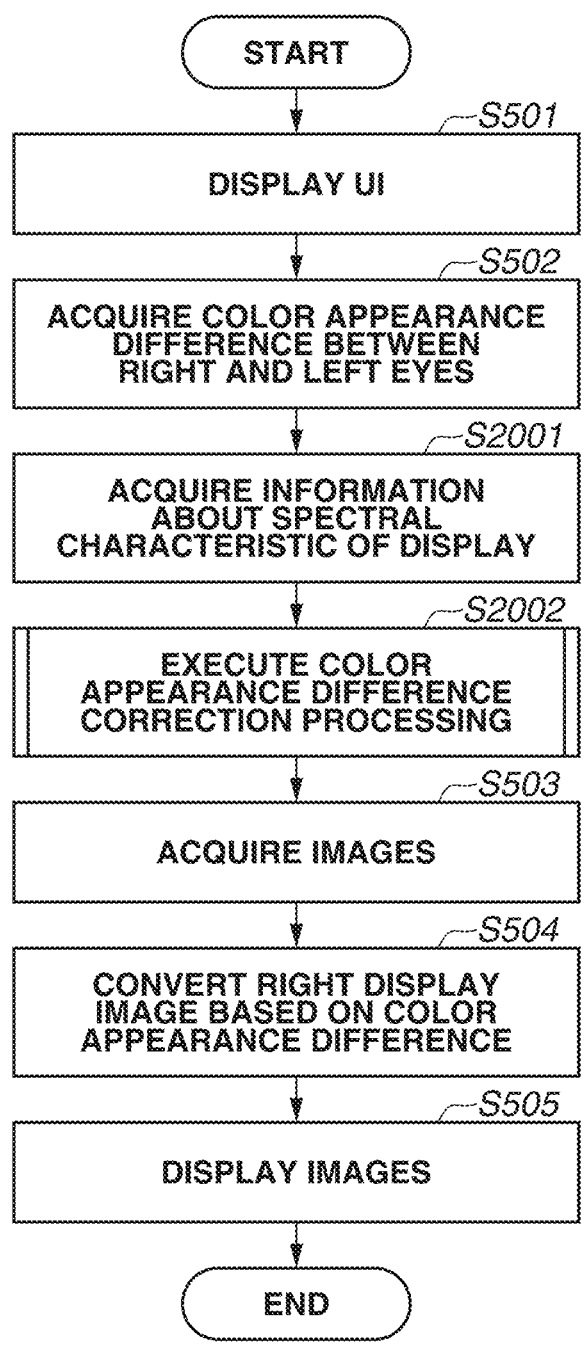
FIG. 20 is a flowchart illustrating processing to be performed by the image processing apparatus.

FIG. 20 is a flowchart illustrating processing performed by the image processing apparatus 1. The flowchart illustrated in FIG. 20 additionally includes operations in steps S2001 and S2002 between the operations in steps S502 and S503 of the flowchart in FIG. 5.

In step S2001, the CPU 101 acquires spectral characteristics of the displays.

In step S2002, the CPU 101 performs the color appearance difference correction processing described below.

<Correction of Color Appearance Difference>

Hereinafter, a method of calculating a correction value for the color appearance difference between the right and left eyes in step S2002 is described.

Figure 21:
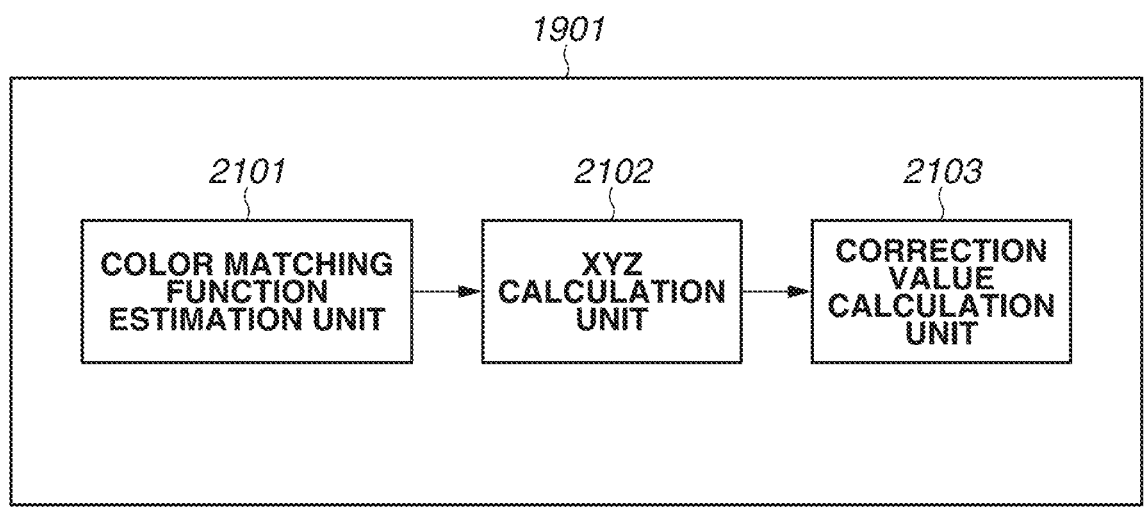
FIG. 21 is a block diagram illustrating details of a user characteristic correction unit.

FIG. 21 is a block diagram schematically illustrating a functional configuration of the user characteristic correction unit 1901.

The user characteristic correction unit 1901 functions as a color matching function estimation unit 2101, an XYZ calculation unit 2102, and a correction value calculation unit 2103.

The color matching function estimation unit 2101 estimates a color matching function from a group of color matching function files based on the color appearance difference between the right and left eyes acquired by the user characteristic acquisition unit 302. FIG. 22 is a table illustrating an example of a group of color matching function files. Columns 2201 indicate a data number. Columns 2202 indicate L*a*b* coordinate values corresponding to coordinate values of a color appearance difference between the right and left eyes. A column 2203 indicates a color matching function file corresponding to the L*a*b* coordinate values. In the color matching function file, a luminosity efficiency factor at wavelengths of 380 nm to 780 nm with respect to color matching functions Sx, Sy, and Sz are described. Hereinafter, the L'a*b* coordinates of the left display 206 are expressed as $L_{left}$, $a_{left}$, and $b_{left}$ ($Lab_{\_left}$), and the L'a*b* coordinates of the right display 204 are expressed as $L_{Right}$, $a_{Right}$, and $b_{Right}$ ($Lab_{\_Right}$). In this case, $Lab_{\_left}$ is L*a*b* coordinates of an initial value of color toning, and $Lab_{\_Right}$ is relative coordinates relative to the L*a*b* coordinates $Lab_{\_left}$. The L*a*b* coordinate $Lab_{\_Right}$ is calculated using a color matching function closest to a relative relationship between the initial value (an optional color matching function or a color matching function with respect to a standard observer) and a color adjustment result, from among the stored group of color matching function files.

The XYZ calculation unit 2102 calculates XYZ values in the CIE XYZ color coordinate system with respect to the right and left displays 204 and 206, based on the spectral characteristics and color matching functions of the right and left displays 204 and 206.

The correction value calculation unit 2103 calculates a correction value for the color appearance difference between the right and left eyes using the XYZ values calculated by the XYZ calculation unit 2102.

Figure 23:
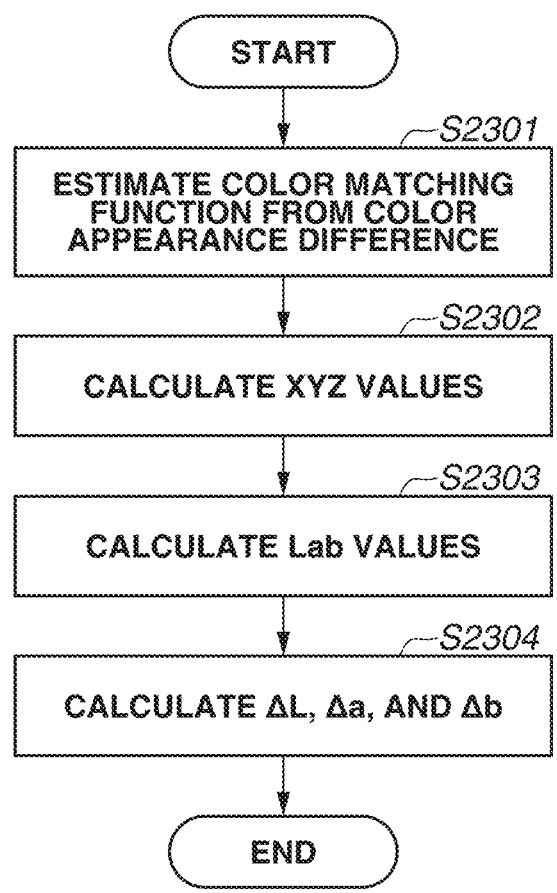
FIG. 23 is a flowchart illustrating processing for correcting a color appearance difference between the right and left eyes.

FIG. 23 is a flowchart illustrating details of processing for correcting a color appearance difference between the right and left eyes in step S2002.

In step S2301, the CPU 101 compares the L'a*b* values in the columns 2202 of FIG. 22 with the color appearance difference between the right and left eyes acquired in step S502. The CPU 101 then estimates a color matching function (column 2203) corresponding to the right display 204 by searching for a data number with the smallest difference.

In step S2302, the CPU 101 calculates XYZ values through the following equations (3) using the color matching functions and spectral characteristics of displays.

$$X = K \int_{380}^{780} P(\lambda) Sx(\lambda) d\lambda \quad (3)$$

$$Y = K \int_{380}^{780} P(\lambda) Sy(\lambda) d\lambda$$

$$Z = K \int_{380}^{780} P(\lambda) Sz(\lambda) d\lambda$$

In equation (3), the symbols represent the following information:

X, Y, and Z respectively indicate X, Y, and Z values specified by the CIE XYZ color coordinate system;
$\lambda$ indicates a wavelength of light (nm);
$P(\lambda)$ indicates a spectral radiance of a display;
Sx, Sy, and Sz respectively indicate a color matching function of X, Y, and Z; and
P and K each indicate a constant number.

The XYZ values of the left display 206 are calculated through the above equations (3) by using a spectral distribution of the left display 206 and a color matching function with respect to a standard observer (or optional color matching function).

The XYZ values of the right display 204 are calculated through the above equations (3) using a spectral distribution of the right display 204 and the color matching function estimated in step S2301.

In step S2303, the CPU 101 calculates $Lab_{right}$ and $Lab_{left}$ based on the XYZ values obtained through the calculation in step S2302 using the following equations (4). In the equations (4), symbols $X_n$, $Y_n$, and $Z_n$ respectively represent X, Y, and Z values of white display values of the left display 206.

$$L = 116 f(Y/Y_n) - 16 \quad (4)$$

$$a = 500 \left[ f(X/X_n) - f(Y/Y_n) \right]$$

-continued $$b = 200 \left[ f(Y/Y_n) - f(Z/Z_n) \right]$$

$$f(t) = \begin{cases} t^{1/3} & t > (6/29)^3 \\ \left[ \left(\frac{29}{3}\right)^3 t + 16 \right]/116 & \text{Other than the above} \end{cases}$$

In step S2304, the CPU 101 calculates a correction value for the color appearance difference between the right and left eyes. A corrected color appearance difference between the right and left eyes is expressed by $\Delta L$, $\Delta a$, and $\Delta b$ in the following equations (5).

$$\Delta L = L_{Right} - L_{Left} \quad (5)$$

$$\Delta a = a_{Right} - a_{Left}$$

$$\Delta b = b_{Right} - b_{Left}$$

Then, a series of processing illustrated in this flowchart is ended.

In step S504 of the present exemplary embodiment, color conversion is performed using a color conversion parameter corresponding to the correction value for the color appearance difference between the right and left eyes calculated through the processing illustrated in the above flowchart.

In the present exemplary embodiment, a correction value is calculated from a color appearance difference between the right and left eyes by using the spectral characteristics of the displays. By using this correction value, a result of a color adjustment performed by the user is made applicable also to other displays, so that it is possible to save effort and time in the color adjustment work.

A fifth exemplary embodiment of the present disclosure will be described. According to the model described in the CIE 170-1: Fundamental Chromaticity Diagram with Physiological Axes Part 1, it is reported that color appearance is changed depending on the size of a viewing angle. Thus, a color appearance difference between the right and left eyes is presumably changed depending on the size of an object. In the fifth exemplary embodiment, color conversion on a display is performed with the size of the viewing angle reflected. Descriptions overlapping with the first to the fourth exemplary embodiments are omitted.

<Functional Configuration of Image Processing Apparatus>

A functional configuration of the image processing apparatus 1 according to the present exemplary embodiment is similar to the functional configuration in the third exemplary embodiment. Hereinafter, points different from the third exemplary embodiment are described with reference to FIG. 19.

The user characteristic correction unit 1901 acquires a viewing angle size for visual recognition. Examples of the viewing angle size include one obtained through calculation from a magnification percentage of an object and/or an optical flow of a moving-object of interest. The user characteristic correction unit 1901 calculates a correction value for the color appearance difference through the below-described processing using a group of color matching function files stored in the ROM 102 or other storages, a color appearance difference between the right and left eyes acquired by the user characteristic acquisition unit 302, a viewing angle size, and spectral characteristics of displays.

For example, a color matching function model generated from a model described in the CIE 170-1: Fundamental Chromaticity Diagram with Physiological Axes Part 1 is used as the group of color matching function files.

<Processing Performed by Image Processing Apparatus>

Figure 24:
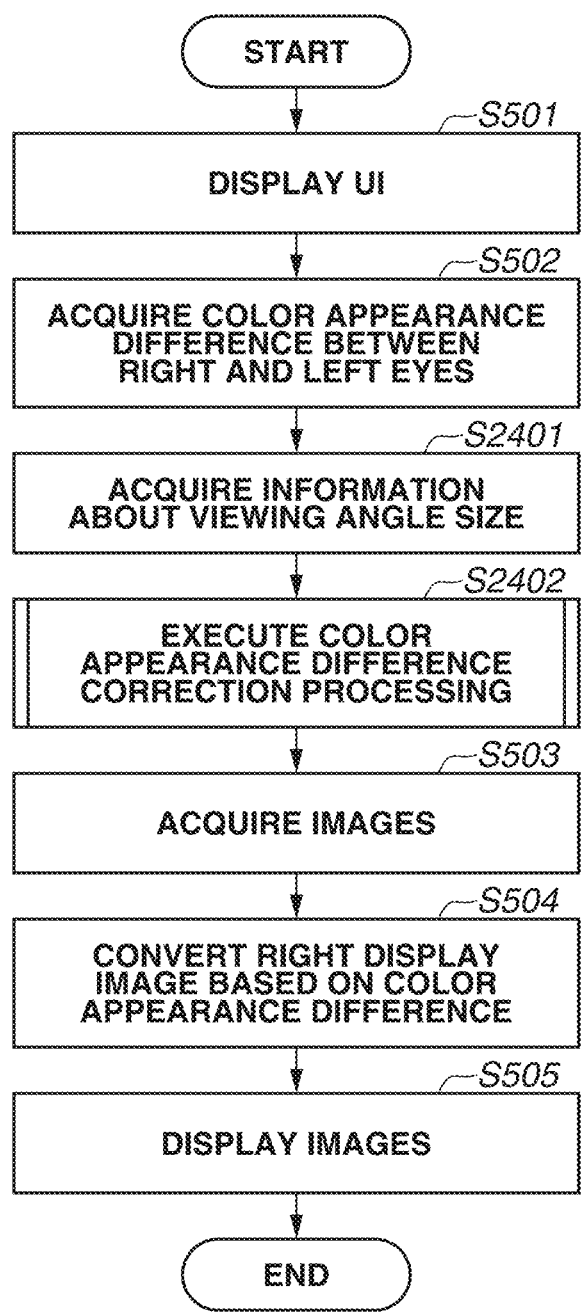
FIG. 24 is a flowchart illustrating processing to be performed by the image processing apparatus.

FIG. 24 is a flowchart illustrating processing to be performed by the image processing apparatus 1. The flowchart illustrated in FIG. 24 additionally includes operations in steps S2401 and S2402 between the operations in steps S502 and S503 of the flowchart in FIG. 5.

In step S2401, the CPU 101 acquires a viewing angle size.

In step S2402, the CPU 101 performs the color appearance difference correction processing described below.

<Correction of Color Appearance Difference>

Hereinafter, a method of correcting a color appearance difference in step S2402 is described with reference to FIG. 21.

The color matching function estimation unit 2101 estimates a color matching function from a group of color matching function files based on the color appearance difference between the right and left eyes and the viewing angle size acquired by the user characteristic acquisition unit 302. FIG. 25 is a table illustrating an example of a group of color matching function files. A column 2501 indicates a data number. Columns 2502 indicate L'a*b* coordinate values corresponding to coordinate values of a color appearance difference between the right and left eyes. A column 2503 indicates viewing angle information. A column 2504 indicates a color matching function file corresponding to the L*a*b* coordinate values and the viewing angle information.

The XYZ calculation unit 2102 calculates XYZ values in the CIE XYZ color coordinate system for the right and left displays 204 and 206 from the spectral characteristics and color matching functions of the right and left displays 204 and 206.

The correction value calculation unit 2103 calculates a correction value for the color appearance difference between the right and left eyes by using the XYZ values calculated by the XYZ calculation unit 2102.

Details of processing for correcting a color appearance difference between the right and left eyes in step S2402 is described with reference to FIG. 23.

In step S2301, the CPU 101 compares the L*a*b* values in the columns 2502 and a value of viewing angle information in the column 2503 illustrated in FIG. 25 with the color appearance difference between the right and left eyes acquired in step S502 and the viewing angle size acquired in step S2401. The CPU 101 estimates a color matching function (column 2504) corresponding to the right display 204 by searching for a data number with the smallest differences.

The operations in steps S2302 to S2304 are similar to the those in the fourth exemplary embodiment, so that descriptions thereof are omitted.

In step S504 according to the present exemplary embodiment, color conversion is performed by using a color conversion parameter corresponding to the correction value for the color appearance difference between the right and left eyes calculated through the processing illustrated in the above flowchart.

In the present exemplary embodiment, a correction value is calculated from the color appearance difference between the right and left eyes using the information about a viewing angle size. The use of this correction value enables a result of a color adjustment performed by the user to be made applicable to an object of other sizes, thus saving user's effort and time in the color adjustment work.

Other Variation Examples

In the above-described exemplary embodiments, color modification is performed in correspondence to the operation performed on the input device(s) 110 such as a mouse, a keyboard, and a controller of the HMD. However, the color modification may be instructed with head-tracking or eye-tracking. For example, tracking in directions of right, left, up, and down may be associated respectively with values, +a*, −a*, +b*, and −b*. Further, tracking may be associated with values +L* and −L*. Furthermore, the user may be allowed to select an item from L*, a*, and b* to modify only a selected item.

In the above-described exemplary embodiments, the color setting display portion and the result display portion are arranged on one UI. However, the color setting display portion and the result display portion may be arranged on different UIs. The color setting display portion and the result display portion may be displayed in a superimposed manner. Further, display/non-display and activation/non-activation of the superimposed color setting display portion may be switched.

In the above-described exemplary embodiments, values of the CIE L*a*b* space are used as color values. However, values of another color space, for example, the CIE LUV color space, the CIE Color Appearance Model (CAM) 97, the CIE CAM 02, or the CIE CAM 16 may also be used.

In the above-described exemplary embodiments, an application for correcting the color appearance difference between the right and left eyes is described as an example. However, for example, the function of correcting the color appearance difference between the right and left eyes may be incorporated as a calibration function of a device. Specifically, the above-described exemplary embodiments may be applied as calibration functions of a monitor serving as an output device.

The above-described exemplary embodiments may be implemented by performing the following processing.

Computer-readable software (i.e., computer program) which implements the functions of the above-described exemplary embodiments is supplied to a system or an apparatus via a network or various storage media. Then, a computer (or a CPU or a micro processing unit (MPU)) of the system or the apparatus reads and performs the program.

According to the present disclosure, it is possible to prevent or reduce the occurrence of a color appearance difference between the right and left eyes.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-125553, filed Aug. 1, 2023, which is hereby incorporated by reference herein in its entirety.

What is claimed is:

1. An image processing apparatus for generating a right eye image and a left eye image, the image processing apparatus comprising:
one or more memories storing a program; and
one or more processors that, upon execution of the stored program, are configured to operate as:
a control unit configured to perform control such that a first display unit serving as a right eye display unit displays a first color chart and a second display unit serving as a left eye display unit displays a second color chart with a color of the first color chart and a color of the second color chart being different;
an acquisition unit configured to acquire a color vision characteristic representing a color appearance difference between right and left eyes of a user based on an instruction of the user with respect to the color appearance difference between the first color chart and the second color chart; and
a conversion unit configured to perform color conversion on at least any one of the right eye image and the left eye image based on the color vision characteristic.

2. The image processing apparatus according to claim 1, wherein, with respect to the first and second charts with a same color in an initial state, the control unit modifies at least any one of the color(s) of the first color chart and the color of the second color chart according to an instruction of the user.

3. The image processing apparatus according to claim 1, wherein the control unit displays the first color chart and the second color chart in a plurality of combinations, and
wherein the acquisition unit acquires the color vision characteristic based on a result acquired by aggregating color differences between the first and second color charts for which the color appearance difference therebetween has been accepted.

4. The image processing apparatus according to claim 1, further comprising a storage unit configured to store color conversion parameters to be used for color conversion,
wherein the conversion unit performs color conversion on at least any one of the right eye image and the left eye image by using a color conversion parameter corresponding to the color vision characteristic.

5. The image processing apparatus according to claim 2, wherein the control unit sets any one of the first display unit and the second display unit to a target display unit according to an instruction of the user, and performs color modification on a color chart to be displayed on the target display unit.

6. The image processing apparatus according to claim 1, wherein the control unit modifies sizes of the first color chart and the second color chart according to an instruction of the user.

7. The image processing apparatus according to claim 1, wherein the control unit modifies colors of background regions of the first color chart and the second color chart according to an instruction of the user.

8. The image processing apparatus according to claim 5, wherein the control unit sets, based on information indicating whether a dominant eye of the user is the right eye or the left eye, any one of the first display unit and the second display unit to the target display unit on which a color chart is to be subjected to the color modification.

9. The image processing apparatus according to claim 2, wherein the control unit receives, as the instruction of the user, L'a*b* values or increased/decreased values of the L*a*b* values.

10. The image processing apparatus according to claim 1, wherein, with respect to the first and second color charts with a same display color in an initial state, the control unit displays the first and second color charts with the display color of at least any one of the first color chart and the second color chart modified to a plurality of colors within a predetermined color modification range, and
wherein the acquisition unit acquires the color vision characteristic based on a result acquired by aggregating color differences between the first and second color charts for which color appearance difference therebetween has been accepted.

11. The image processing apparatus according to claim 1, wherein the first display unit serving as the right eye display unit displays a first region and the second display unit serving as the left eye display unit displays a second region, from among regions acquired by dividing a color chart in a horizontal direction or a vertical direction, with the first region and the second region being different in color,
wherein the acquisition unit acquires the color vision characteristic based on an instruction of the user with respect to a color appearance difference between the first region and the second region.

12. The image processing apparatus according to claim 11, wherein the color chart is divided into three or more regions in at least any one direction of a horizontal direction and a vertical direction, and the regions acquired by dividing the color chart are alternately displayed on the first display unit and the second display unit.

13. The image processing apparatus according to claim 11, wherein the color chart is divided into regions arranged in a checkered pattern, and the regions acquired by dividing the color chart are alternately displayed on the first display unit and the second display unit.

14. The image processing apparatus according to claim 1, wherein the first display unit serving as a display unit for any one of a right eye and a left eye displays a first region expressing a predetermined shape in a color chart and the second display unit serving as a display unit for the other one of the right eye and the left eye displays a second region expressing a background of the first region in the color chart, with the first region and the second region being different in color,
  wherein the acquisition unit acquires the color vision characteristic based on an instruction of the user with respect to a color appearance difference between the first region and the second region.

15. The image processing apparatus according to claim 11, wherein the control unit modifies color(s) of at least any one of the first region and the second region according to an instruction of the user.

16. The image processing apparatus according to claim 1,
  wherein the acquisition unit calculates a correction value for the color vision characteristic based on a color matching function in correspondence to the color vision characteristic and spectral characteristics of the first display unit and the second display unit, and
  wherein the conversion unit performs color conversion on at least any one of the right eye image and the left eye image based on the correction value for the color vision characteristic.

17. The image processing apparatus according to claim 16, wherein the acquisition unit calculates the correction value for the color vision characteristic, based on a color matching function together with the color vision characteristic and viewing angle information about the first display unit and the second display unit, and the spectral characteristics of the first display unit and the second display unit.

18. An image processing method for generating a right eye image and a left eye image, the image processing method comprising:
  performing control such that a first display unit serving as a right eye display unit displays a first color chart and a second display unit serving as a left eye display unit displays a second color chart with a color of the first color chart and a color of the second color chart being different;
  acquiring a color vision characteristic representing a color appearance difference between right and left eyes of a user based on an instruction of the user with respect to the color appearance difference between the first color chart and the second color chart; and
  performing color conversion on at least any one of the right eye image and the left eye image based on the color vision characteristic.

19. A non-transitory computer-readable storage medium storing instructions that, when executed by a computer, cause the computer to perform a method for generating a right eye image and a left eye image, the method comprising:
  performing control such that a first display unit serving as a right eye display unit displays a first color chart and a second display unit serving as a left eye display unit displays a second color chart with a color of the first color chart and a color of the second color chart being different;
  acquiring a color vision characteristic representing a color appearance difference between right and left eyes of a user based on an instruction of the user with respect to the color appearance difference between the first color chart and the second color chart; and
  performing color conversion on at least any one of the right eye image and the left eye image based on the color vision characteristic.

\* \* \* \* \*